United States Patent
Nishizono

(10) Patent No.: US 11,307,774 B2
(45) Date of Patent: Apr. 19, 2022

(54) STORAGE CONTROL DEVICE, NON-TRANSITORY COMPUTER-READABLE STORAGE MEDIUM, AND STORAGE CONTROL METHOD

(71) Applicant: FUJITSU LIMITED, Kawasaki (JP)

(72) Inventor: Shinichi Nishizono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/167,122

(22) Filed: Feb. 4, 2021

(65) Prior Publication Data

US 2021/0303179 A1 Sep. 30, 2021

(30) Foreign Application Priority Data

Mar. 26, 2020 (JP) .............................. JP2020-056639

(51) Int. Cl.
*G06F 3/06* (2006.01)
*G06F 12/00* (2006.01)
*G06F 13/00* (2006.01)

(52) U.S. Cl.
CPC ............ *G06F 3/0619* (2013.01); *G06F 3/065* (2013.01); *G06F 3/067* (2013.01); *G06F 3/0653* (2013.01); *G06F 3/0659* (2013.01); *G06F 3/0683* (2013.01)

(58) Field of Classification Search
CPC ...... G06F 3/0619; G06F 3/065; G06F 3/0653; G06F 3/0659
USPC ......................................................... 711/162
See application file for complete search history.

(56) References Cited

U.S. PATENT DOCUMENTS

| 6,101,585 A * | 8/2000 | Brown ................. G06F 11/1451 |
| | | 707/999.204 |
| 6,594,744 B1 * | 7/2003 | Humlicek ............. G06F 3/0601 |
| | | 714/766 |
| 11,132,332 B2 * | 9/2021 | Matsui ..................... G06F 3/065 |
| 2005/0163014 A1 | 7/2005 | Soeda |
| 2013/0042049 A1 * | 2/2013 | Fiske ................... G06F 12/0246 |
| | | 711/E12.008 |
| 2013/0086308 A1 | 4/2013 | Nakata |

FOREIGN PATENT DOCUMENTS

| JP | 2002-229741 A | 8/2002 |
| JP | 2005-208950 A | 8/2005 |
| JP | 2013-077074 A | 4/2013 |

* cited by examiner

*Primary Examiner* — Mohamed M Gebril
(74) *Attorney, Agent, or Firm* — Fujitsu Patent Center

(57) ABSTRACT

A storage control device includes a memory and a processor. The processor configured to, when a request for writing first data to a first unit region among unit regions included in a first storage region is received, write the first data to the first unit region in a second storage region corresponding to a snapshot, the snapshot being corresponding to the first storage region. The processor is further configured to send a first completion response to the request for writing. The processor is further configured to, when a first read request requesting for reading from the first unit region in the second storage region is received, send second data stored in the first unit region in the first storage region, as read data in accordance with the first read request.

14 Claims, 21 Drawing Sheets

FIG. 15

| | DATA ARRANGEMENT EXPECTED BY USER | | ACTUAL DATA ARRANGEMENT | | COPY MANAGEMENT DATA | |
|---|---|---|---|---|---|---|
| | VOL0 | SSV1 | VOL0 | SSV1 | BMw1 | BMs1 |
| R1 | D1 | D1 | D1 | | 0 | 0 |
| R2 | D2 | D2 | D2 | | 0 | 0 |
| R3 | D3 | D3 | D3 | | 0 | 0 |
| R4 | D4 | D4 | D4 | | 0 | 0 |

(T21)

| | VOL0 | SSV1 | VOL0 | SSV1 | BMw1 | BMs1 |
|---|---|---|---|---|---|---|
| W → | D1a | D1 | D1 | D1a | 1 | 1 |
| | D2 | D2 | D2 | | 0 | 0 |
| | D3 | D3 | D3 | | 0 | 0 |
| | D4 | D4 | D4 | | 0 | 0 |

(T22)

| | VOL0 | SSV1 | VOL0 | SSV1 | BMw1 | BMs1 |
|---|---|---|---|---|---|---|
| | D1a | D1 | D1 | D1a | 1 | 1 |
| | D2 | D2 | D2 | | 0 | 0 |
| | D3 | D3 | D3 | | 0 | 0 |
| | D4 | D4 | D4 | | 0 | 0 |

(T23)

| | SSV2 | SSV2 | BMw2 | BMs2 |
|---|---|---|---|---|
| | D1a | | 0 | 0 |
| | D2 | | 0 | 0 |
| | D3 | | 0 | 0 |
| | D4 | | 0 | 0 |

DATA ARRANGEMENT EXPECTED BY USER

| VOL0 | SSV1 |
|---|---|
| D1a | D1 |
| D2a | D2 |
| D3b | D3 |
| D4 | D4 |

| SSV2 |
|---|
| D1a |
| D2 |
| D3 |
| D4 |

| SSV3 |
|---|
| D1b ← W |
| D2a |
| D3 |
| D4 |

ACTUAL DATA ARRANGEMENT

| VOL0 | SSV1 |
|---|---|
| D1 | D1a |
| D2 | |
| D3 | |
| D4 | |

| SSV2 |
|---|
| |
| D2a |
| |
| |

| SSV3 |
|---|
| D1b |
| |
| D3a |
| |

COPY MANAGEMENT DATA

| BMw1 | BMs1 |
|---|---|
| 1 | 1 |
| 0 | 0 |
| 0 | 0 |
| 0 | 0 |

| BMw2 | BMs2 |
|---|---|
| 0 | 0 |
| 1 | 1 |
| 0 | 0 |
| 0 | 0 |

| BMw3 | BMs3 |
|---|---|
| 0 | 1 |
| 0 | 0 |
| 1 | 1 |
| 0 | 0 |

---

(T29)

DATA ARRANGEMENT EXPECTED BY USER

| VOL0 | SSV1 |
|---|---|
| D1a | D1 |
| D2a | D2 |
| D3b | D3 |
| D4 | D4 |

| SSV2 |
|---|
| D1a |
| D2 |
| D3 |
| D4 |

| SSV3 |
|---|
| D1b |
| D2a |
| D3c ← W |
| D4 |

ACTUAL DATA ARRANGEMENT

| VOL0 | SSV1 |
|---|---|
| D1 | D1a |
| D2 | |
| D3 | |
| D4 | |

| SSV2 |
|---|
| |
| D2a |
| D3b |
| |

| SSV3 |
|---|
| D1b |
| |
| D3c |
| |

COPY MANAGEMENT DATA

| BMw1 | BMs1 |
|---|---|
| 1 | 1 |
| 0 | 0 |
| 0 | 0 |
| 0 | 0 |

| BMw2 | BMs2 |
|---|---|
| 0 | 0 |
| 1 | 1 |
| 1 | 1 |
| 0 | 0 |

| BMw3 | BMs3 |
|---|---|
| 0 | 1 |
| 0 | 0 |
| 0 | 1 |
| 0 | 0 |

FIG. 20

| ADDRESS RANGE (LBA) | SSV NUMBER |
|---|---|
| 0 TO 99 | 3 |
| 100 TO 199 | 7 |
| 200 TO 299 | – |
| ... | ... |

133

– – – – – – – – – – – – – – – – – – – – – – – – – – – – – – – – –

STORAGE CONTROL DEVICE, NON-TRANSITORY COMPUTER-READABLE STORAGE MEDIUM, AND STORAGE CONTROL METHOD

CROSS-REFERENCE TO RELATED APPLICATION

This application is based upon and claims the benefit of priority of the prior Japanese Patent Application No. 2020-56639, filed on Mar. 26, 2020, the entire contents of which are incorporated herein by reference.

FIELD

The embodiments discussed herein are related to a storage control device, A non-transitory computer-readable storage medium and, a storage control method.

BACKGROUND

Known techniques related to data backup include a snapshot. A snapshot is a data image of a storage region created at a certain time point. As an example of a method for creating snapshots, a method based on a copy-on-write method is known. For example, when a snapshot of a certain storage region is created by using the copy-on-write method, the actual data in the storage region is not copied at the time of creating the snapshot but management information for enabling data in the storage region to be referenced is created. Then, when the original storage region is updated later, the data prior to the update is saved in a storage region for snapshots, and then the original storage region is updated with new data. By using such method, a response to a request for creating a snapshot may be made in a short time.

Proposals as described below have been made regarding the creation of snapshots using the copy-on-write method. For example, there has been proposed a data storage system that achieves higher usage efficiency of a storage region by storing data in all the snapshot replication volumes into a shared logical volume that serves as an actual data storage region. Furthermore, for example, there has been proposed a storage device that stores, into an aggregated bit map, information representing presence or absence of a copy to the copy destination volume for each generation in association with a logical address in the copy source volume, and accesses the logical address on the basis of the aggregated bit map when a request for reading from the copy destination volume is made.

Japanese Laid-open Patent Publication No. 2002-229741 and Japanese Laid-open Patent Publication No. 2013-77074 are disclosed as related art.

SUMMARY

According to an aspect of the embodiments, a storage control device comprising: a memory; and a processor coupled to the memory and configured to: when a request for writing first data to a first unit region among unit regions included in a first storage region is received, write the first data to the first unit region in a second storage region corresponding to a snapshot, the snapshot being corresponding to the first storage region, send a first completion response to the request for writing, and when a first read request requesting for reading from the first unit region in the second storage region is received, send second data stored in the first unit region in the first storage region, as read data in accordance with the first read request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a diagram (part 1) illustrating an example of transition of data arrangement;

FIG. 16 is a diagram (part 2) illustrating an example of transition of data arrangement;

FIG. 18 is a diagram (part 4) illustrating an example of transition of data arrangement;

FIG. 20 is a diagram illustrating a configuration example of an SSV map table.

DESCRIPTION OF EMBODIMENTS

According to the related art of a conventional copy-on-write method, during a time period between making a request for updating data in the original storage region corresponding to a snapshot and sending a response to the request, a process of copying the data prior to update from the original storage region to a storage region in the snapshot to save the data is performed. Because of such copying process being performed, it takes a longer time to respond after an update request is made, posing a problem of impairing the response performance.

In one aspect, an object of the embodiments is to shorten the time for responding to a request for updating the original storage region, using a storage control device and a storage control program that are capable of correctly creating a snapshot of the storage region.

Hereinafter, embodiments will be described with reference to the drawings.

First Embodiment

Figure 1:
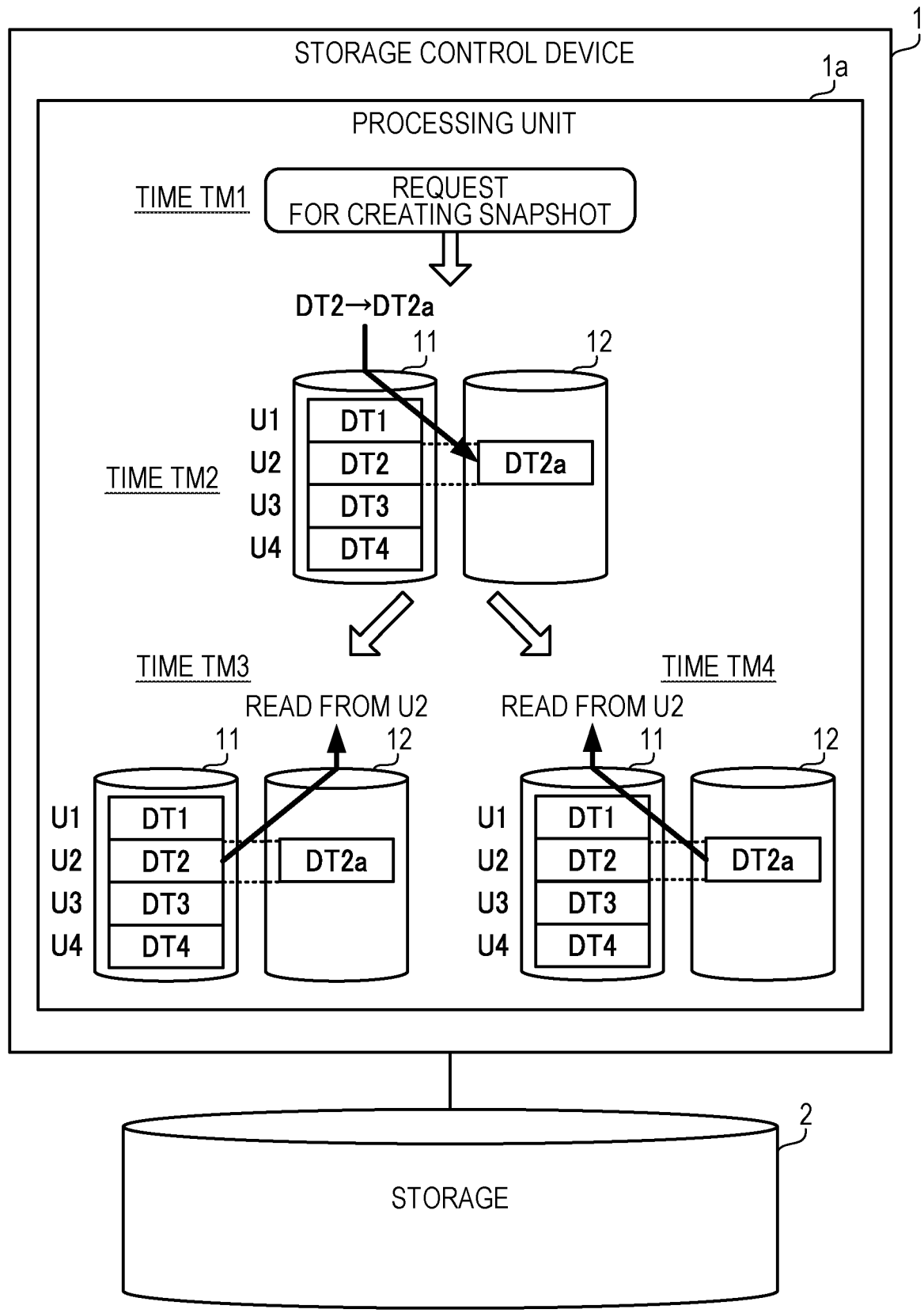
FIG. 1 is a diagram illustrating a configuration example and a processing example of a storage system according to a first embodiment.

FIG. 1 is a diagram illustrating a configuration example and a processing example of a storage system according to a first embodiment. The storage system illustrated in FIG. 1 includes a storage control device 1 and a storage 2. The storage control device 1 controls access to the storage 2. The storage control device 1 includes a processing unit 1a. The processing unit 1a is implemented as, for example, a processor. The storage 2 includes one or more storage devices such as a hard disk drive (HDD) to implement a physical storage region.

The following description assumes that a storage region 11 to and from which a host device (not illustrated) writes and reads is configured. The storage region 11 is, for example, a logical storage region implemented by using a physical storage region in the storage 2. For example, the storage region 11 is divided into four unit regions U1 to U4 each having a certain size. In addition, data DT1 to DT4 are stored in the unit regions U1 to U4, respectively.

At time TM1, the processing unit 1a receives a request for creating a snapshot corresponding to the storage region 11. At that time, as in a process of creating a snapshot based on a copy-on-write method, a completion response to snapshot creation is returned without copying the actual data from the original storage region 11 to a storage region 12 corresponding to the snapshot. Note that, in a case where the original storage region 11 is a logical storage region, the storage region 12 is a logical storage region having the same size as the storage region 11 and has no entity as of time TM1. When data is written later, a physical storage region is allocated to the storage region 12 from the storage 2.

After that, upon receiving a request for writing data (update) to the storage region 11, the processing unit 1a writes the target data of the write request to the storage region 12 corresponding to a snapshot, not to the storage region 11. For example, suppose that a request for writing data DT2a to the unit region U2 in the storage region 11 is received at time TM2. In this case, the processing unit 1a writes the data DT2a not to the storage region 11 but to the unit region U2 in the storage region 12, and returns a completion response when the writing is completed. As described above, when a request for writing to the original storage region 11 is made, data copying is not performed between storage regions.

Next, suppose that, for example, a request for reading from the unit region U2 in the storage region 12 is made at time TM3. Upon receiving such read request, the processing unit 1a reads the data DT2 from the unit region U2 in the storage region 11, not from the storage region 12, and returns the read data as the read data in accordance with the read request. With such processing, correct data may be read in response to a request for reading from a snapshot.

Furthermore, suppose that, for example, a request for reading from the unit region U2 in the storage region 11 is made at time TM4. Upon receiving such read request, the processing unit 1a reads the data DT2a from the unit region U2 in the storage region 12, not from the storage region 11, and returns the read data as the read data in accordance with the read request. With such processing, correct data may be read in response to a request for reading from the original storage region 11.

According to the above processing, data copying is not performed between storage regions when a request for updating the original storage region 11 is made after a request for creating a snapshot is made. Therefore, the time period between an update request and a response may be shortened and the response performance may be improved. In addition, as described above, correct data may be read irrespective of whether the data is read from a snapshot or from the original storage region 11.

Therefore, the time for responding to a request for updating the original storage region may be shortened in a storage control device that is capable of correctly creating a snapshot of the storage region and is capable of reading correct data corresponding to a snapshot and the original storage region.

Second Embodiment

Figure 2:
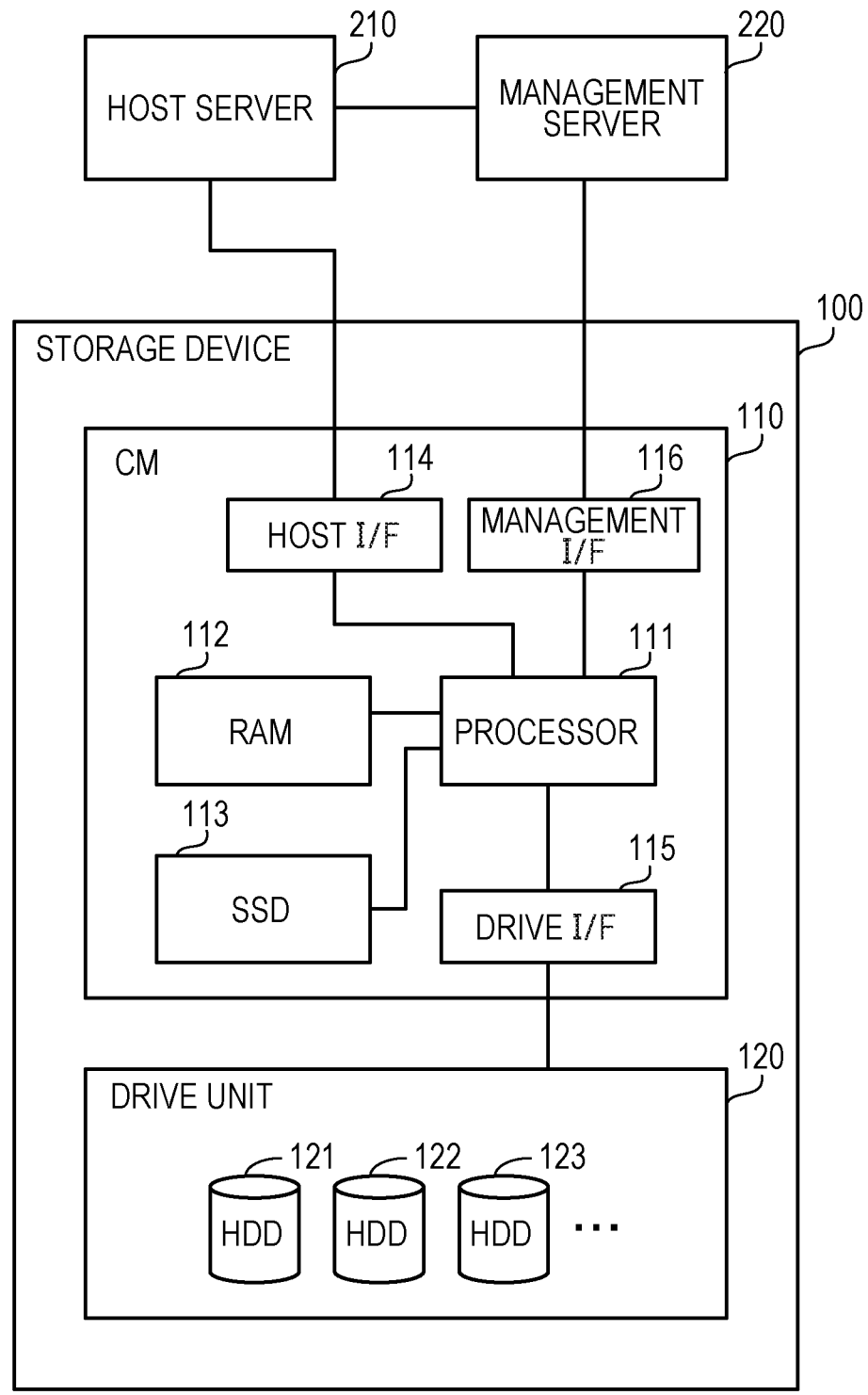
FIG. 2 is a diagram illustrating a configuration example of a storage system according to a second embodiment.

FIG. 2 is a diagram illustrating a configuration example of a storage system according to a second embodiment. The storage system illustrated in FIG. 2 includes a storage device 100, a host server 210, and a management server 220. The storage device 100 includes a controller module (CM) 110 and a drive unit 120. The host server 210 and the management server 220 are connected to the CM 110 via a network (not illustrated).

Note that the CM 110 is an example of the storage control device 1 illustrated in FIG. 1. In addition, the drive unit 120 is an example of the storage 2 illustrated in FIG. 1.

The CM 110 is a storage control device that controls access to a storage device disposed in the drive unit 120 in response to a request sent from the host server 210. The drive unit 120 is equipped with a plurality of storage devices to be accessed from the host server 210. As an example, the drive unit 120 in the present embodiment is a disk array device in which a plurality of storage devices, that is, HDDs 121, 122, 123, and so on, are disposed.

The host server 210 accesses a storage region provided by the storage device 100 in conjunction with a predetermined process such as a business process. For example, the CM 110 provides a logical volume (logical storage region) through the use of an HDD in the drive unit 120, and the host server 210 accesses the HDD in the drive unit 120 by sending a request for accessing the logical volume to the CM 110.

The management server 220 manages the storage device 100. For example, the management server 220 is capable of instructing the CM 110 in the storage device 100 to create a snapshot of a logical volume.

The following describes a hardware configuration example of the CM 110.

The CM 110 includes a processor 111, a random access memory (RAM) 112, a solid state drive (SSD) 113, a host interface (I/F) 114, a drive interface (I/F) 115, and a management interface (I/F) 116.

The processor 111 integrally controls the entire CM 110. The processor 111 is, for example, a central processing unit (CPU), a micro processing unit (MPU), a digital signal processor (DSP), an application specific integrated circuit (ASIC), or a programmable logic device (PLD). Furthermore, the processor 111 may be a combination of two or more elements of the CPU, MPU, DSP, ASIC, and PLD.

The RAM 112 is used as a main storage device of the CM 110. The RAM 112 temporarily stores at least part of an operating system (OS) program and an application program to be executed by the processor 111. Furthermore, the RAM 112 stores various data needed for the processing by the processor 111.

The SSD 113 is used as an auxiliary storage device of the CM 110. The SSD 113 stores an OS program, an application program, and various data. Note that another type of non-volatile storage device such as an HDD may be used as the auxiliary storage device.

The host interface 114 is an interface for communicating with the host server 210. The host interface 114 communicates with the host server 210 via a storage area network (SAN) employing, for example, a fiber channel (FC), an Internet small computer system interface (iSCSI), or the like.

The drive interface 115 is an interface for communicating with the HDDs 121, 122, 123, and so on in the drive unit 120. The drive interface 115 communicates with the drive unit 120 by using, for example, Serial Attached SCSI (SAS).

The management interface 116 is an interface for communicating with the management server 220. The management interface 116 communicates with the management server 220 via a local area network (LAN), for example.

Note that, like the CM 110, the host server 210 and the management server 220 each may be implemented as a computer equipped with a processor, a RAM, and the like.

Meanwhile, the CM 110 has a function of creating a snapshot of a logical volume by using a copy-on-write method. Furthermore, the CM 110 is capable of creating snapshots of multiple generations for a single logical volume.

Now, a comparative example of a process of creating snapshots of multiple generations is described below with reference to FIGS. 3 and 4, followed by description of a process according to the second embodiment.

Figure 3:
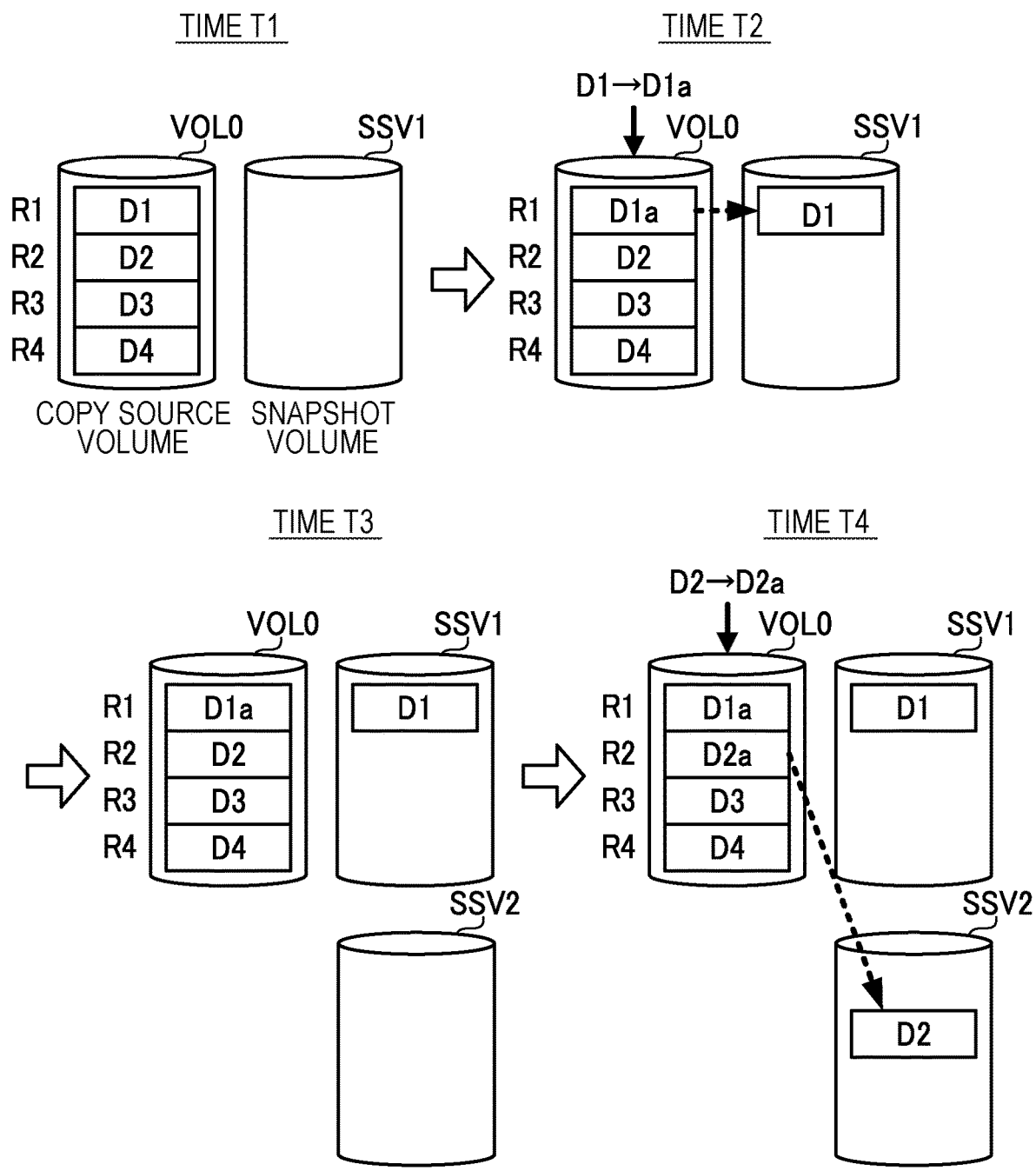
FIG. 3 is a diagram (part 1) illustrating a comparative example of a process of creating snapshots of multiple generations.
Figure 4:
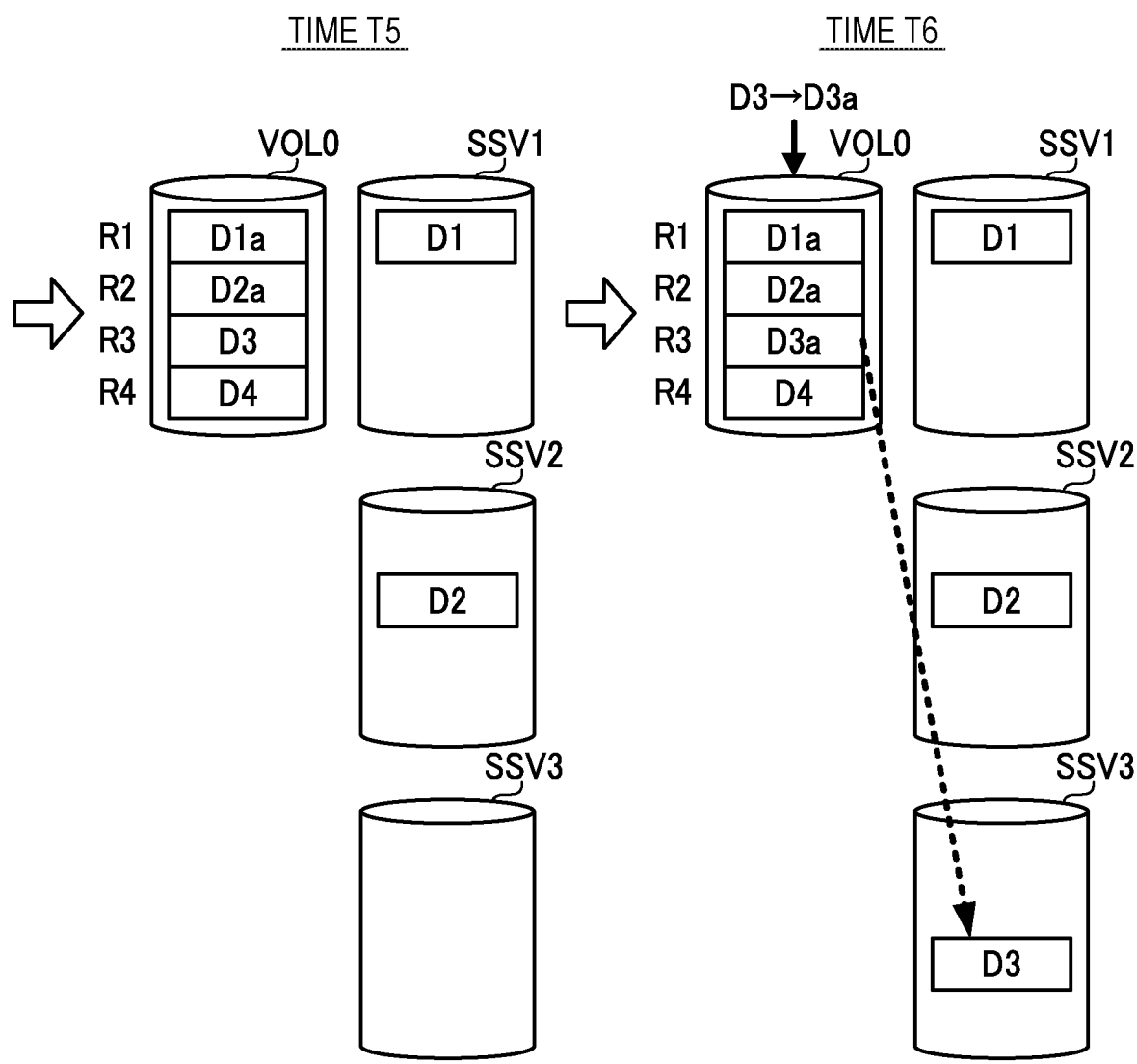
FIG. 4 is a diagram (part 2) illustrating a comparative example of a process of creating snapshots of multiple generations.

FIGS. 3 and 4 are diagrams illustrating a comparative example of a process of creating snapshots of multiple generations.

In FIGS. 3 and 4, a copy source volume VOL0 is a logical volume from which a snapshot is to be created. The copy source volume VOL0 is divided into regions each having a certain size and serving as a copy management unit. To simplify the description, it is assumed here that the copy source volume VOL0 is divided into four regions R1 to R4. Furthermore, it is assumed that the data D1 to D4 are stored in the regions R1 to R4, respectively, in the initial state in FIG. 3.

Suppose that, at time T1, a request for creating a first-generation snapshot of the copy source volume VOL0 is made. Then, a first-generation snapshot volume SSV1 is created. In the case of a copy-on-write method, at time T1, management information regarding the snapshot volume SSV1 is only created, while actual data copying to the snapshot volume SSV1 is not performed.

Next, suppose that, at time T2, a request for writing data D1a to the region R1 in the copy source volume VOL0 (updating the data D1 in the region R1) is made. In this case, first, the data D1 prior to update stored in the region R1 is saved (stored) in the region R1 in the snapshot volume SSV1. Then, when the saving is completed, the data in the region R1 in the copy source volume VOL0 is overwritten with the new data D1a.

Next, suppose that, at time T3, a request for creating a second-generation snapshot of the copy source volume VOL0 is made. Then, a second-generation snapshot volume SSV2 is created. Note that, as in the first generation, at time T3, management information regarding the snapshot volume SSV2 is only created, while actual data copying to the snapshot volume SSV2 is not performed.

Next, suppose that, at time T4, a request for writing data D2a to the region R2 in the copy source volume VOL0 (updating the data D2 in the region R2) is made. In this case, first, the data D2 prior to update stored in the region R2 is saved (stored) in the region R2 in the snapshot volume SSV2. Then, when the saving is completed, the data in the region R2 in the copy source volume VOL0 is overwritten with the new data D2a.

Next, suppose that, at time T5, a request for creating a third-generation snapshot of the copy source volume VOL0 is made. Then, a third-generation snapshot volume SSV3 is created. Note that, as in the earlier generations, at time T5, management information regarding the snapshot volume SSV3 is only created, while actual data copying to the snapshot volume SSV3 is not performed.

Next, suppose that, at time T6, a request for writing data D3a to the region R3 in the copy source volume VOL0 (updating the data D3 in the region R3) is made. In this case, first, the data D3 prior to update stored in the region R3 is saved (stored) in the region R3 in the snapshot volume SSV3. Then, when the saving is completed, the data in the region R3 in the copy source volume VOL0 is overwritten with the new data D3a.

Through the above-described procedure, three generations of snapshots are created by using a copy-on-write method. The above-described process makes it possible to quickly respond to a request for creating a snapshot because the actual data is not copied as of the time when the request for creating a snapshot is made. However, in the above-described process, when a request for updating the copy source volume VOL0 is made, the data prior to update is copied to a snapshot volume, and then data is written to the copy source volume VOL0, as illustrated in the figures of times T2, T4, and T6. Therefore, as it takes a longer time to copy the data prior to update, the time for responding to a write request becomes longer, posing a problem of impairing the response performance.

To overcome such problem, in the second embodiment, when the copy source volume is updated after a request for creating a snapshot is made, the update data is written not to the copy source volume but to a snapshot volume. Accordingly, data copying between volumes is avoided when a request for writing to and updating the copy source volume is made, resulting in a shorter time for responding to the write request.

Figure 5:
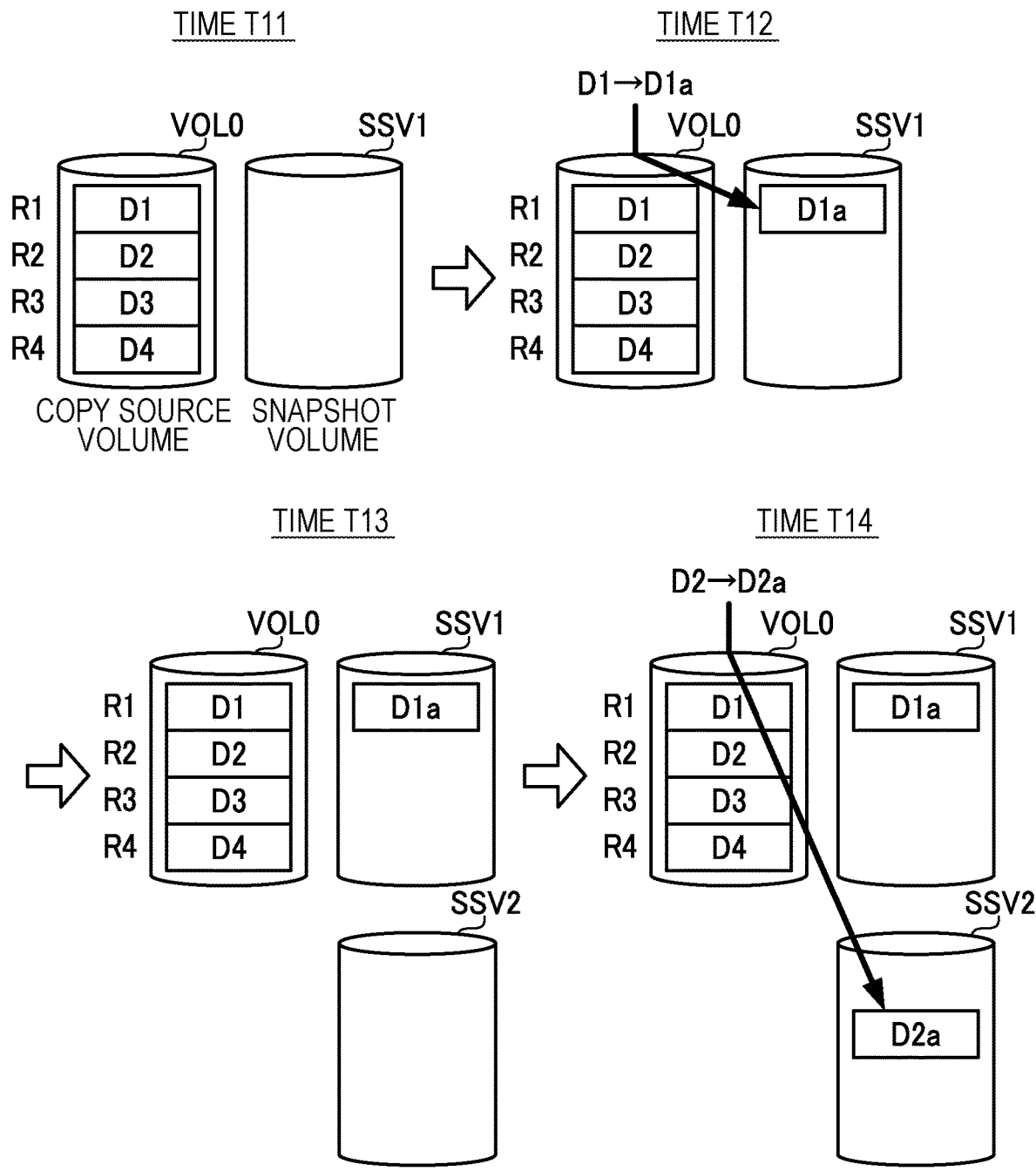
FIG. 5 is a diagram (part 1) illustrating an example of a process of creating snapshots according to the second embodiment.
Figure 6:
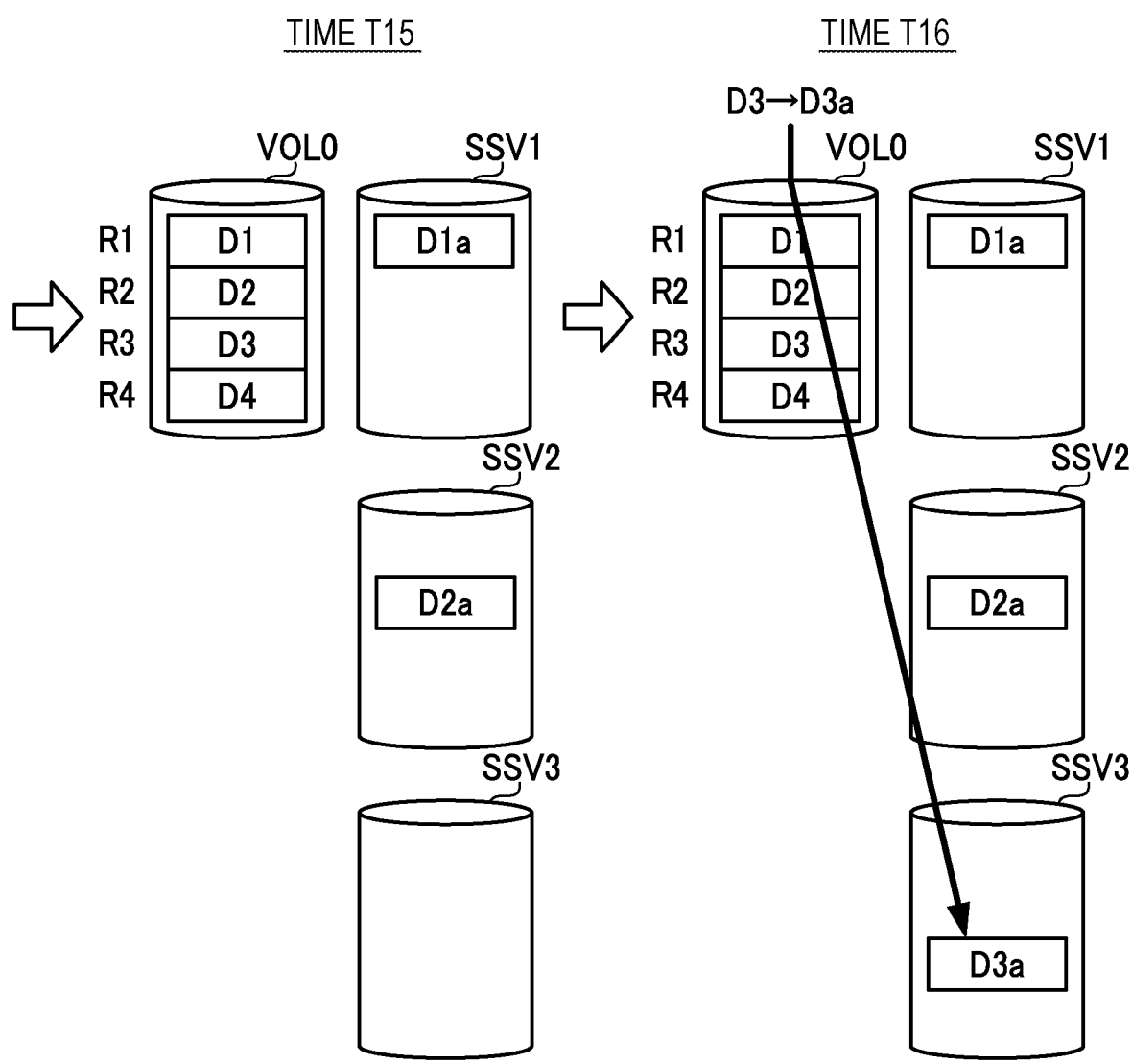
FIG. 6 is a diagram (part 2) illustrating an example of a process of creating snapshots according to the second embodiment.
Figure 7:
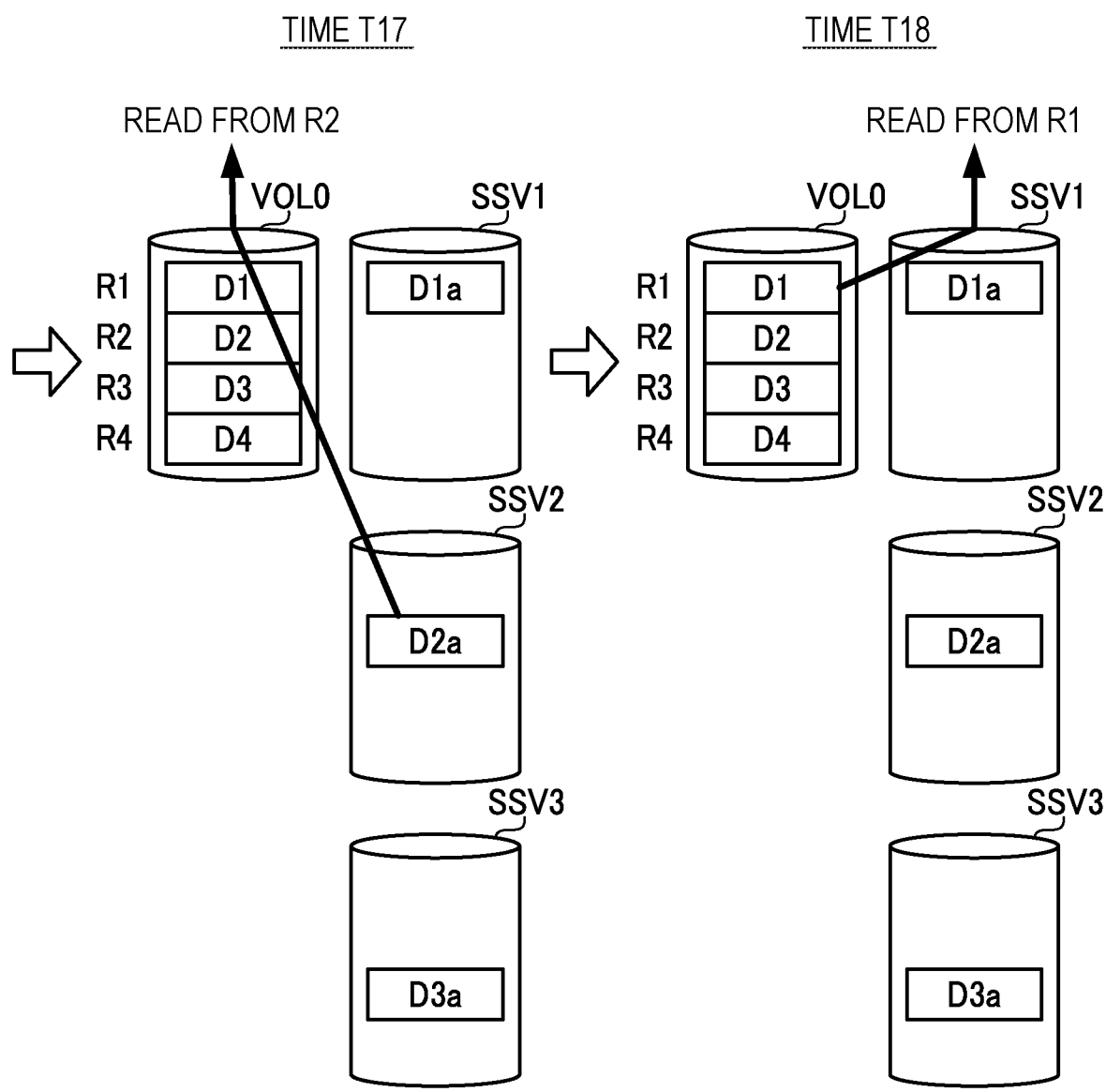
FIG. 7 is a diagram (part 3) illustrating an example of a process of creating snapshots according to the second embodiment.

FIGS. 5 to 7 are diagrams illustrating an example of a process of creating snapshots according to the second embodiment.

Suppose that, at time T11, a request for creating a first-generation snapshot of the copy source volume VOL0 is made. Then, a first-generation snapshot volume SSV1 is created by using a copy-on-write method. In other words, as in the case at time T1 in FIG. 3, management information regarding the snapshot volume SSV1 is only created, while actual data copying to the snapshot volume SSV1 is not performed.

Next, suppose that, at time T12, a request for writing data D1a to the region R1 in the copy source volume VOL0 (updating the data D1 in the region R1) is made. Then, the new data D1a is written not to the copy source volume VOL0 but to the snapshot volume SSV1. The data D1 prior to update on the copy source volume VOL0 is kept unchanged.

Next, suppose that, at time T13, a request for creating a second-generation snapshot of the copy source volume VOL0 is made. Then, a second-generation snapshot volume SSV2 is created by using a copy-on-write method.

Next, suppose that, at time T14, a request for writing data D2a to the region R2 in the copy source volume VOL0 (updating the data D2 in the region R2) is made. Then, the new data D2a is written not to the copy source volume VOL0 but to the snapshot volume SSV2. The data D2 prior to update on the copy source volume VOL0 is kept unchanged.

Next, suppose that, at time T15, a request for creating a third-generation snapshot of the copy source volume VOL0 is made. Then, a third-generation snapshot volume SSV3 is created by using a copy-on-write method.

Next, suppose that, at time T16, a request for writing data D3a to the region R3 in the copy source volume VOL0 (updating the data D3 in the region R3) is made. Then, the new data D3a is written not to the copy source volume VOL0 but to the snapshot volume SSV3. The data D3 prior to update on the copy source volume VOL0 is kept unchanged.

As described above, after a snapshot volume is created, the update data for updating the copy source volume is written to the snapshot volume of the latest generation. As a result, the time for responding to a request for writing to the copy source volume (update request) may be shortened.

Next, suppose that, at time T17, a request for reading from the region R2 in the copy source volume VOL0 is made. The region R2 was updated, and the update data D2a is stored in the snapshot volume SSV2. Therefore, as the data in the region R2 in the copy source volume VOL0, the data D2a is read from the snapshot volume SSV2. As described above, the data updated in the copy source volume is stored in the snapshot volume. Therefore, when a request for reading the data is made, the data is read from the snapshot volume.

Next, suppose that, at time T18, a request for reading from the region R1 in the first-generation snapshot volume SSV1 is made. In this case, since the desired data is stored in the region R1 in the copy source volume VOL0, the data D1 is read from the region R1 in the copy source volume VOL0. In this way, when a request for reading from a snapshot volume of a certain generation is made, data is read from a volume other than the snapshot volume.

The following describes the storage system according to the second embodiment in more detail.

Figure 8:
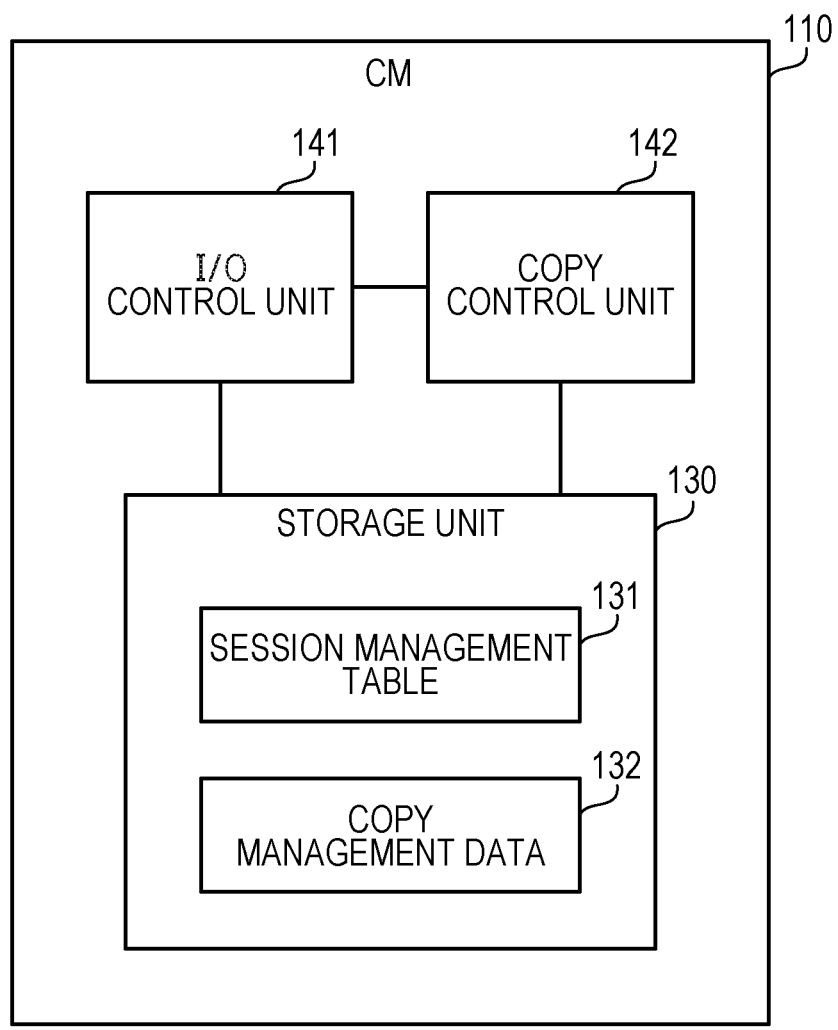
FIG. 8 is a diagram illustrating a configuration example of processing functions of a CM.

FIG. 8 is a diagram illustrating a configuration example of processing functions of the CM. The CM 110 includes a storage unit 130, an input/output (I/O) control unit 141, and a copy control unit 142.

The storage unit 130 is implemented as, for example, a storage region in a storage device included in the CM 110, such as the RAM 112 or the SSD 113. The storage unit 130 stores a session management table 131 and copy management data 132.

The session management table 131 holds session information regarding a process of creating a snapshot. A session represents a process performed between two volumes. In the present embodiment, when a snapshot of a certain volume is to be created, a snapshot session is set between the creation source volume (copy source volume) and the creation destination volume (snapshot volume). The session management table 131 holds setting information regarding a session that has been set for a volume in the storage device 100 (a logical volume implemented by a storage region in an HDD in the drive unit 120).

The copy management data 132 includes various types of management data to be referenced in the processing related to the volume for which a snapshot session is set. The copy management data 132 will be described later with reference to FIG. 9.

Processing in the I/O control unit 141 and the copy control unit 142 is implemented by, for example, the processor 111 executing a predetermined program. The I/O control unit 141 performs I/O processing on a volume in the storage device 100 in response to an I/O request from the host server 210. During processing, the I/O control unit makes an inquiry to the copy control unit 142 about which copy source volume or which volume among snapshot volumes is to be accessed, and performs the I/O processing on the basis of the result of the inquiry.

The copy control unit 142 creates a snapshot volume of the specified volume, upon receiving a request for creating a snapshot from the management server 220. During processing, the copy control unit 142 sets various types of management data corresponding to the created snapshot volume in the copy management data 132. In addition, in response to an inquiry from the I/O control unit 141, the copy control unit 142 identifies the volume to be accessed by the I/O control unit 141 while referencing the session management table 131 and the copy management data 132. Furthermore, the copy control unit 142 updates the copy management data 132 as appropriate in accordance with the contents of an I/O request.

Figure 9:
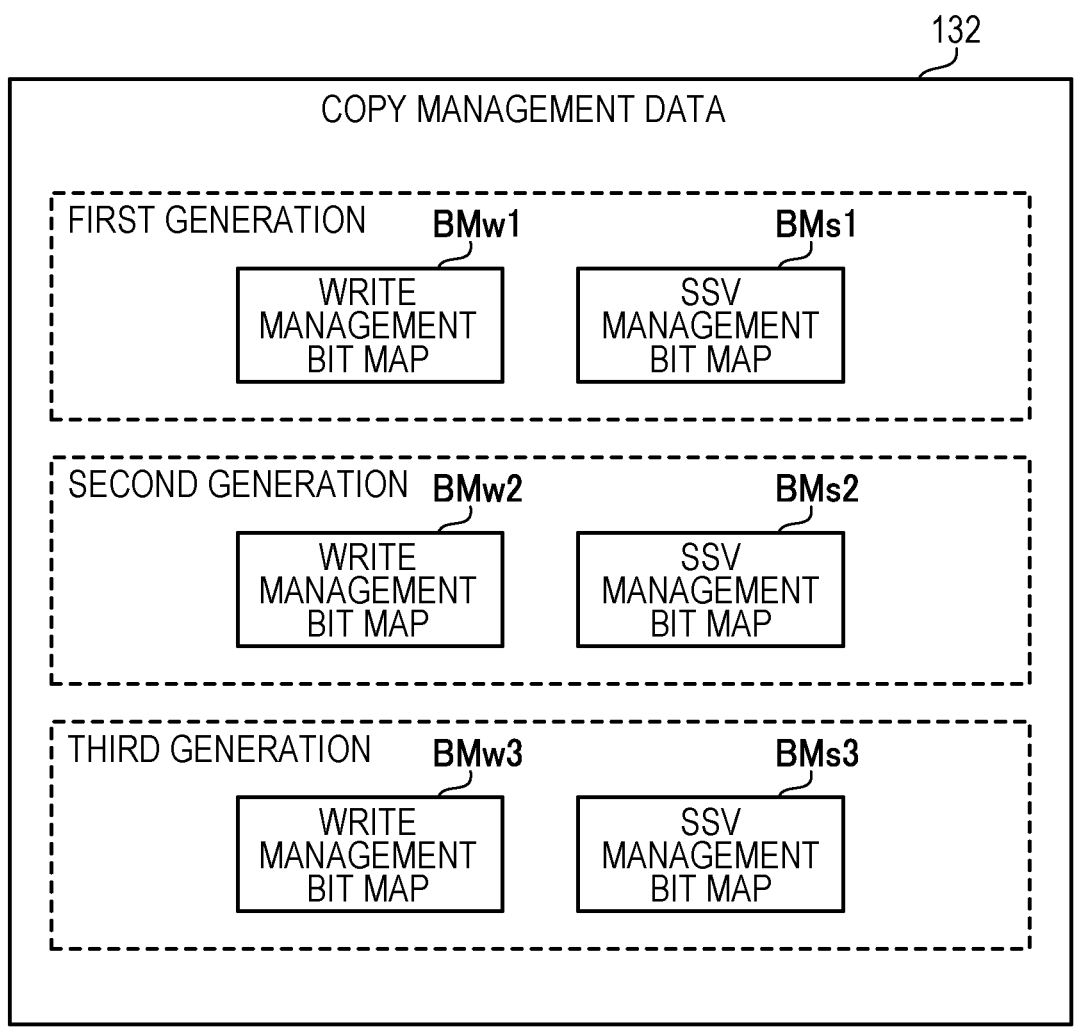
FIG. 9 is a diagram illustrating an example of copy management data.

FIG. 9 is a diagram illustrating an example of the copy management data. As illustrated in FIG. 9, the copy management data 132 includes a write management bit map and a snapshot volume (SSV) management bit map.

A write management bit map and an SSV management bit map are created for each snapshot session. In addition, in a case where snapshots of multiple generations are created from a single copy source volume, a write management bit map and an SSV management bit map are created for each generation.

The following description assumes that snapshot volumes of multiple generations SSV1 to SSV3 are created for one copy source volume VOL0, as in the examples in FIGS. 5 and 6. It is further assumed that a write management bit map BMw1 and an SSV management bit map BMs1 illustrated in FIG. 9 are created in conjunction with the creation of the first-generation snapshot volume SSV1. In addition, it is assumed that a write management bit map BMw2 and an SSV management bit map BMs2 illustrated in FIG. 9 are created in conjunction with the creation of the second-generation snapshot volume SSV2. Moreover, it is assumed that a write management bit map BMw3 and an SSV management bit map BMs3 illustrated in FIG. 9 are created in conjunction with the creation of the third-generation snapshot volume SSV3.

Every write management bit map and SSV management bit map has bits for the individual copy management unit regions in a volume. In the examples in FIGS. 5 and 6, every write management bit map and SSV management bit map has bits corresponding to the regions R1 to R4, respectively.

Each bit in a write management bit map indicates whether a request for writing to the corresponding region in the copy source volume has been made during a time period between creation of a snapshot of the corresponding generation and creation of a snapshot of the following generation. The bit value is set to "0" in the initial state, and the bit value is updated to "1" when a write request is made.

Each bit in an SSV management bit map indicates whether data is present in the corresponding region in a snapshot volume of the corresponding generation. The bit value is set to "0" in the initial state, and the bit value is updated to "1" when data is written.

Basic control based on write management bit maps and SSV management bit maps is performed as follows.

When a request for writing to the copy source volume is made following a request for creating a snapshot, the desired data to be written (write data) is stored into the snapshot volume of the latest generation, as in the examples illustrating times T12, T14, and T16 in FIGS. 5 and 6. At this time, the applicable bit in each of the write management bit map and the SSV management bit map of the latest generation is updated to "1".

For example, when a request for reading from the copy source volume is made, the applicable bit in a write management bit map is referenced from new to old generations. Then, if the value of the referenced bit is "1", the desired data to be read (read data) is read from the snapshot volume of the corresponding generation. On the other hand, if the value of every applicable bit is "0", which means the target region of the read request is not updated yet, read data is read from the copy source volume.

In addition, when a request for reading from the snapshot volume of a certain generation is made, the applicable bit in the write management bit map corresponding to the generation is referenced. If the value of the applicable bit is "1", the applicable bit in the write management bit map corresponding to an earlier generation is referenced from new to old generations.

If the value of the referenced bit is "1", read data is read from the snapshot volume of the corresponding generation. This case represents that the applicable region in the copy source volume is updated at a time point before creation of the snapshot volume from which data is desired to be read. On the other hand, if the value of every applicable bit is "0", read data is read from the copy source volume. This case represents that the applicable region in the copy source volume is not updated during a time period before creation of the snapshot volume from which data is desired to be read.

In addition, referencing the SSV management table achieves accurate reading irrespective of whether data is written to a snapshot volume. For example, if the value of the applicable bit is "0" in the write management bit map corresponding to the generation of the snapshot volume from which data is desired to be read, the applicable bit in the SSV management bit map corresponding to that generation is referenced. If the value of the applicable bit is "1", this means that a request for writing to the application region in the snapshot volume of that generation has been made. Therefore, read data is read from the snapshot volume.

The following describes processing in the CM 110 with reference to a flowchart.

Figure 10:
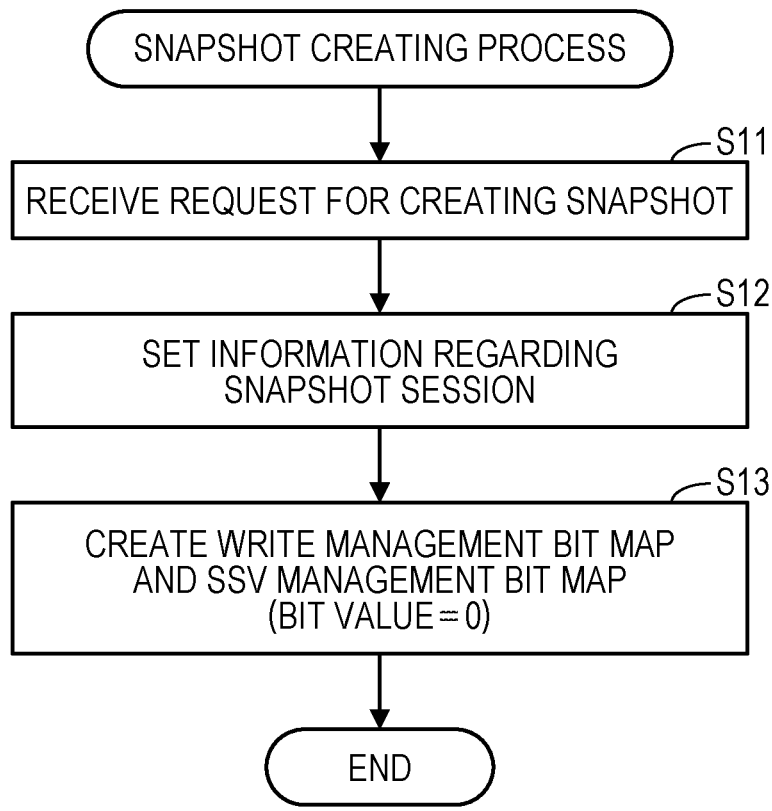
FIG. 10 is a flowchart illustrating an example of a procedure for creating a snapshot.

First, FIG. 10 is a flowchart illustrating an example of a procedure for creating a snapshot.

[Step S11] The copy control unit 142 receives a request for creating a snapshot from the management server 220. At this time, the volume (copy source volume) from which the snapshot is created is specified.

[Step S12] The copy control unit 142 sets, in the session management table 131, information indicating a snapshot session between the specified copy source volume and a new snapshot volume.

[Step S13] The copy control unit 142 creates a write management bit map and an SSV management bit map corresponding to the snapshot session that has been set, and registers the created write management bit map and SSV management bit map in the copy management data 132. At this time, every bit in each bit map is set to a bit value of "0".

Figure 11:
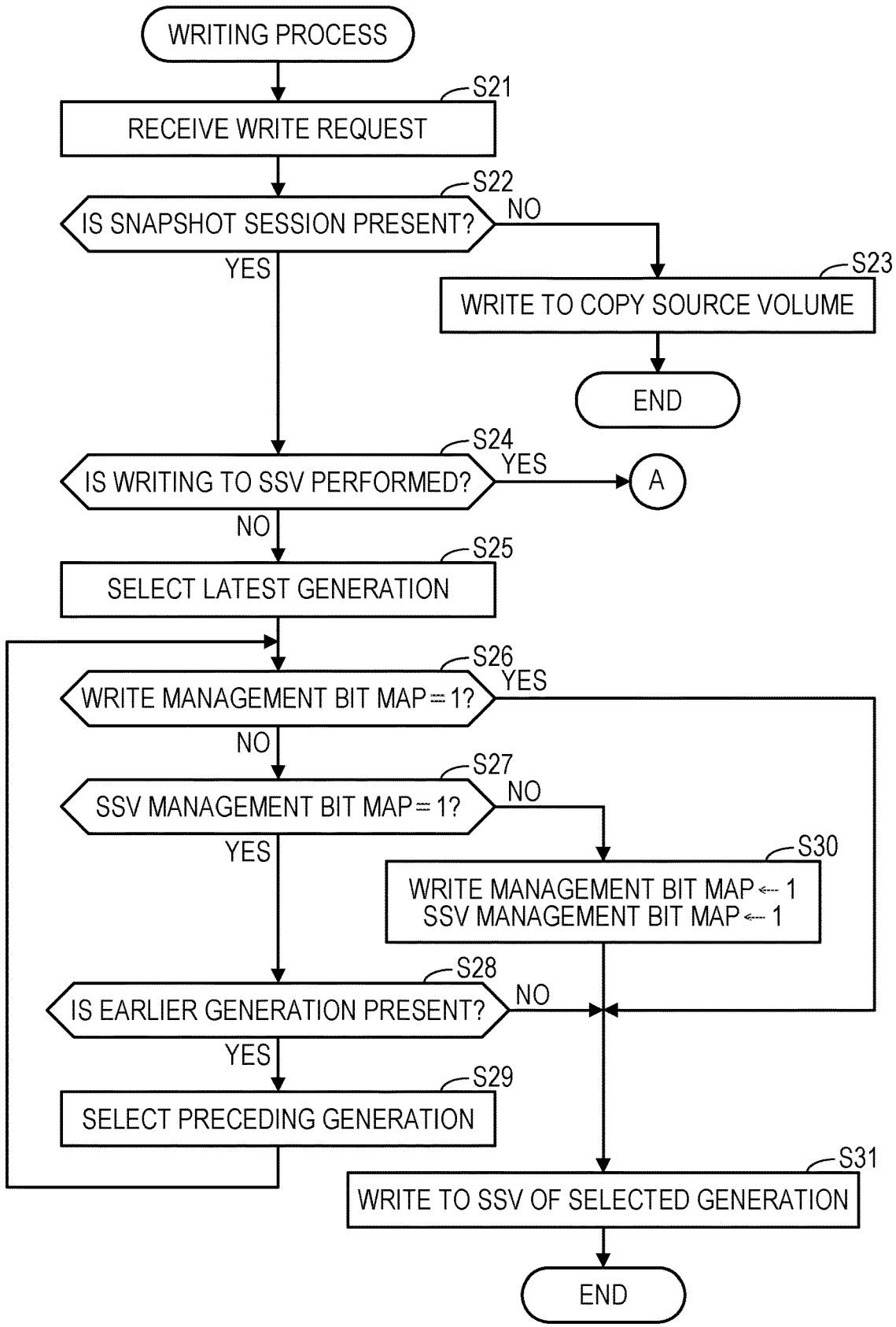
FIG. 11 is a flowchart (part 1) illustrating an example of a writing procedure.
Figure 12:
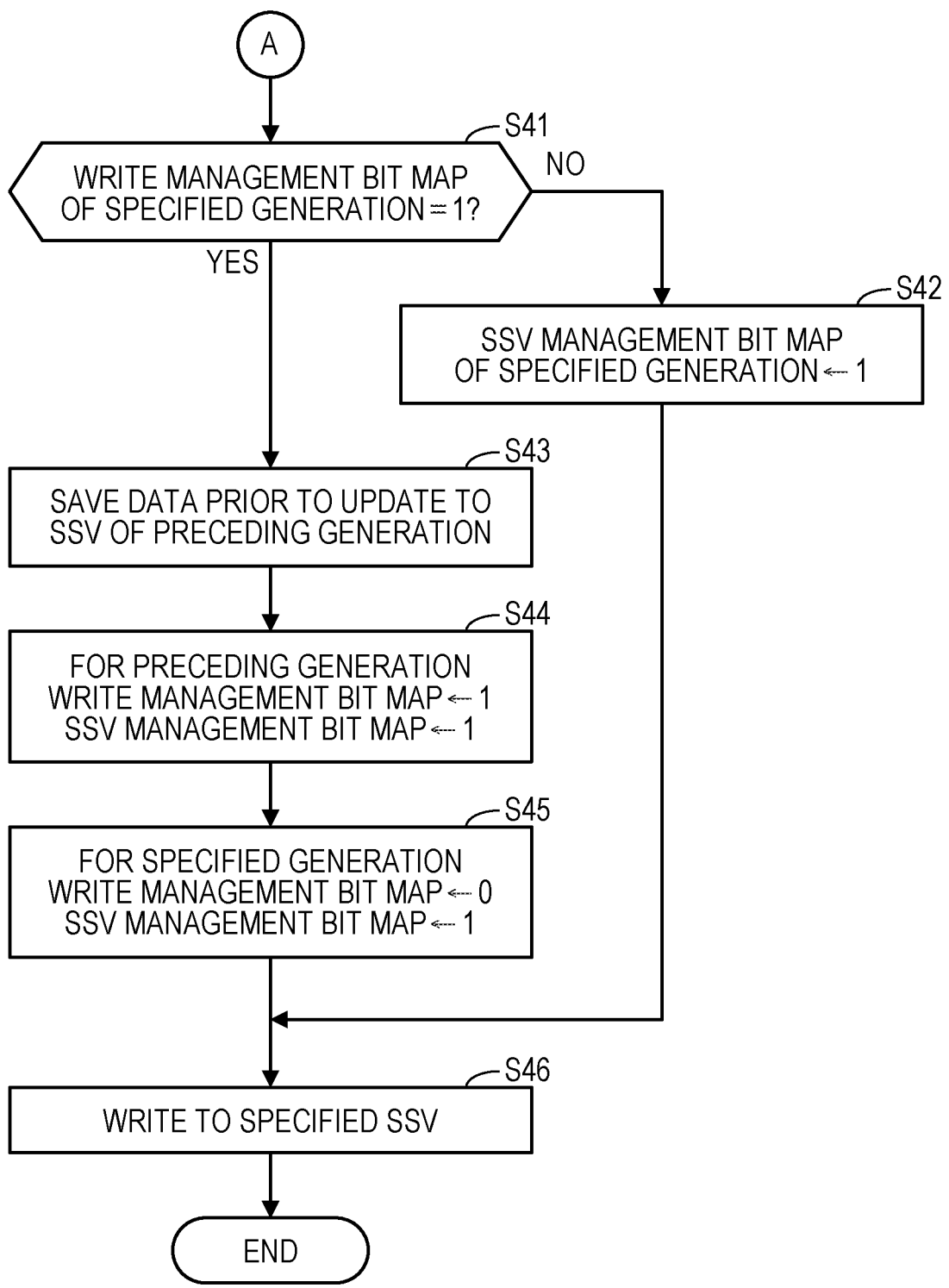
FIG. 12 is a flowchart (part 2) illustrating an example of a writing procedure.

FIGS. 11 and 12 are flowcharts illustrating an example of a writing procedure.

[Step S21] A request for writing to a volume is sent along with write data from the host server 210, and the I/O control unit 141 receives the write request and the write data. At this time, the write destination volume name and the write destination region (address region) are specified. The I/O control unit 141 notifies the copy control unit 142 of the specified volume name and write destination region, and inquires to which volume the data is to be written.

[Step S22] The copy control unit 142 references the session management table 131 to determine whether a snapshot session has been set for the volume specified as the write destination. If the applicable snapshot session has been set, the processing goes to step S24. If the applicable snapshot session has not been set, the processing goes to step S23.

[Step S23] The copy control unit 142 gives notification to the I/O control unit 141 to instruct the I/O control unit 141 to write the write data to the volume (corresponding to the copy source volume) specified as the write destination. In response to the notification, the I/O control unit 141 writes the write data to the specified write destination region in the volume and, when the writing is completed, sends a completion response to the host server 210.

[Step S24] If a snapshot volume is specified as the write destination, the copy control unit 142 advances the processing to step S41 in FIG. 12. On the other hand, if the copy source volume is specified as the write destination, the copy control unit 142 advances the processing to step S25.

[Step S25] The copy control unit 142 selects the latest generation from the generations of the snapshot volume corresponding to the specified copy source volume.

[Step S26] The copy control unit 142 acquires the value of the bit corresponding to the specified write destination region from the write management bit map corresponding to the selected generation. If the bit value is "1", the processing goes to step S31. If the bit value is "0", the processing goes to step S27.

[Step S27] The copy control unit 142 acquires the value of the bit corresponding to the specified write destination region from the SSV management bit map corresponding to the selected generation. If the bit value is "1", the processing goes to step S28. If the bit value is "0", the processing goes to step S30.

[Step S28] The copy control unit 142 references the session management table 131 to determine, with regard to the copy source volume specified as the write destination, whether a snapshot volume of an earlier generation (a generation preceding the currently selected generation) is present. If a snapshot volume of an earlier generation is present, the processing goes to step S29. If the currently selected generation is the oldest generation, the processing goes to step S31.

[Step S29] The copy control unit 142 selects a generation immediately preceding the currently selected generation. After that, the processing goes to step S26 to proceed with processing on the newly selected generation.

[Step S30] The copy control unit 142 updates the value of the bit corresponding to the specified write destination region to "1", among the bits in the write management bit map corresponding to the selected generation. Furthermore, the copy control unit 142 updates the value of the bit corresponding to the specified write destination region to "1", among the bits in the SSV management bit map corresponding to the selected generation.

[Step S31] The copy control unit 142 gives notification to the I/O control unit 141 to instruct the I/O control unit 141 to write the write data to the snapshot volume corresponding to the selected generation among the snapshot volumes corresponding to the copy source volume. In response to the notification, the I/O control unit 141 writes the write data to the specified write destination region in the snapshot volume. When the writing is completed, the I/O control unit 141 sends a completion response to the host server 210.

According to the processing in steps S25 to S31, when a request for writing to the copy source volume is made after a snapshot is created, the data desired to be written is written to a snapshot volume of some generation. In the course of the processing, no data copying occurs between volumes. Therefore, the time period between a write request and a response may be shortened and the response performance may be improved.

Description is continued below with reference to FIG. 12.

FIG. 12 represents a case where a request for writing to a snapshot volume is made. In this case, write data is written to the snapshot volume specified as the write destination. Note that, however, the snapshot volume may already contain write data that was desired to be written to the copy source volume. In this case, the data needs to be saved. Therefore, first, it is determined in step S41 whether such data saving is needed.

[Step S41] The copy control unit 142 acquires the value of the bit corresponding to the specified write destination region from the write management bit map corresponding to the generation (specified generation) of the snapshot volume specified as the write destination.

If the bit value is "1", the processing goes to step S43. In this case, in the specified generation (in other words, during the time period between creation of the specified snapshot volume and creation of the snapshot volume of the following generation), a request for writing to the applicable region in the copy source volume was made. In addition, the write data as of that time is stored in the write destination region in the snapshot volume specified as the write destination. For this reason, in order to keep the data for the copy source volume, the stored write data (the data prior to update) is saved in the snapshot volume of the preceding generation.

On the other hand, If the bit value is "0", the processing goes to step S42. In this case, no request for writing to the applicable region in the specified snapshot volume was made in the specified generation. Therefore, data saving is not needed.

[Step S42] The copy control unit 142 updates the value of the bit corresponding to the specified write destination region to "1", among the bits in the SSV management bit map corresponding to the specified generation.

[Step S43] The copy control unit 142 requests the I/O control unit 141 to save the data stored in the write destination region in the specified snapshot volume (the data prior to update) to the snapshot volume of the immediately preceding generation. In response to the request, the I/O control unit 141 copies and saves the applicable write data into the write destination region in the snapshot volume of the immediately preceding generation.

[Step S44] The copy control unit 142 updates the value of each bit corresponding to the specified write destination region to "1", among bits in the write management bit map and the SSV management bit map corresponding to the immediately preceding generation. Setting bit values in this way indicates that the data stored in the snapshot volume is the data for the copy source volume.

[Step S45] The copy control unit 142 updates the value of the bit corresponding to the specified write destination region to "0", among the bits in the write management bit map corresponding to the specified generation. Furthermore, the copy control unit 142 updates the value of the bit corresponding to the specified write destination region to "1", among the bits in the SSV management bit map corresponding to the specified generation. Setting bit values in this way indicates that the data stored in the snapshot volume is the data for the snapshot, not for the copy source volume.

[Step S46] The copy control unit 142 gives notification to the I/O control unit 141 to instruct the I/O control unit 141 to write the write data to the snapshot volume specified as the write destination. In response to the notification, the I/O control unit 141 writes the write data to the specified write destination region in the snapshot volume. When the writing is completed, the I/O control unit 141 sends a completion response to the host server 210.

Figure 13:
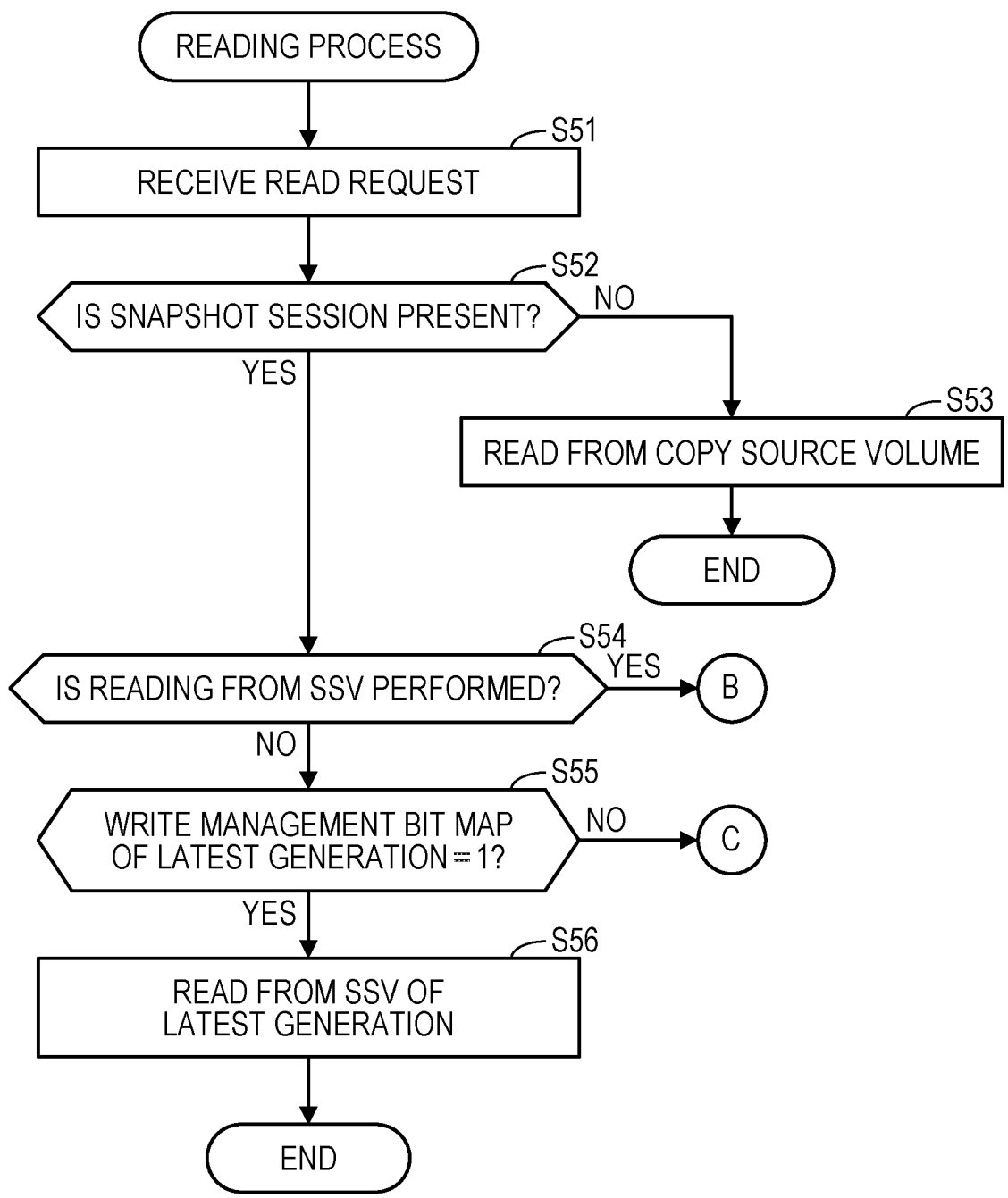
FIG. 13 is a flowchart (part 1) illustrating an example of a reading procedure.
Figure 14:
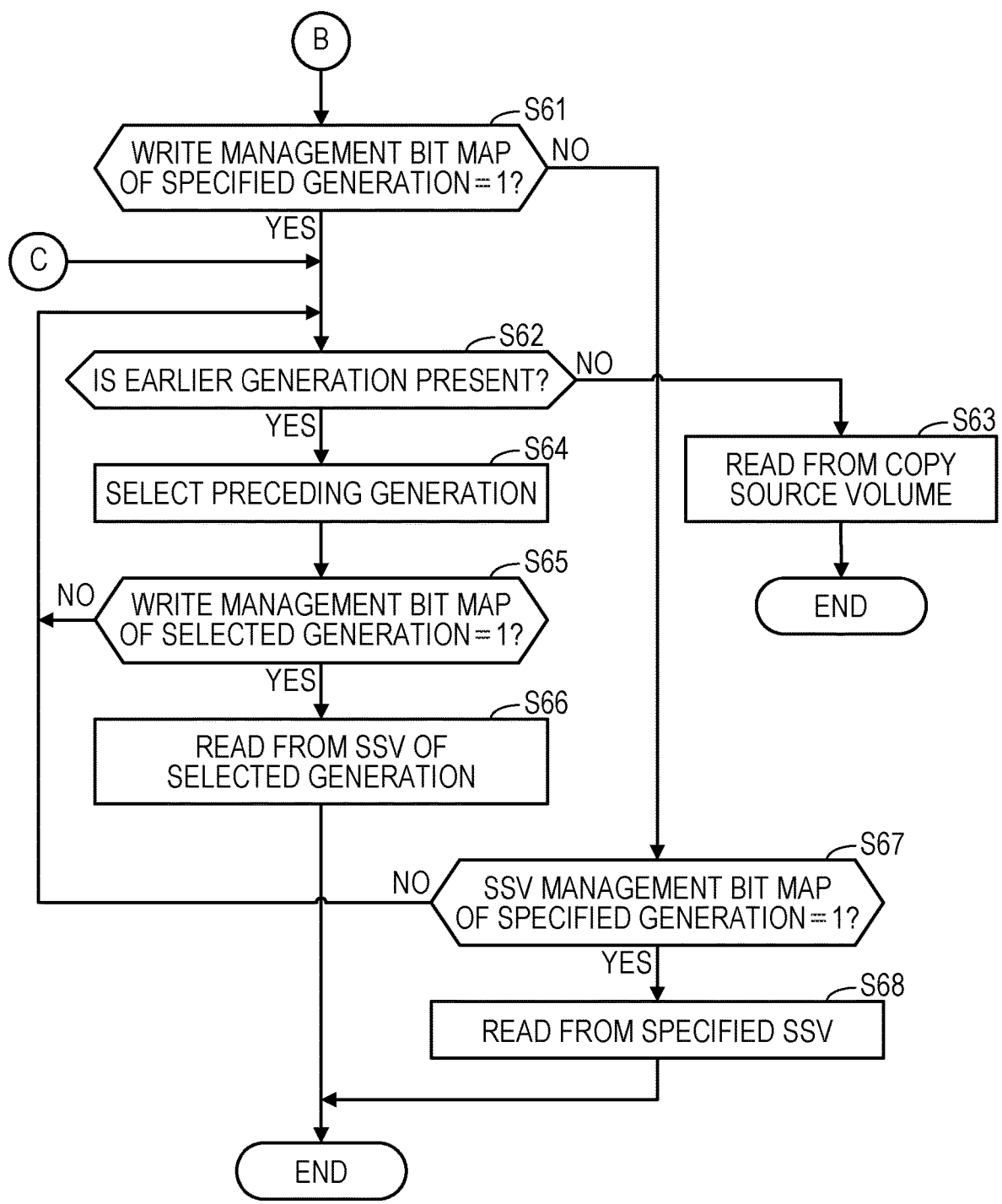
FIG. 14 is a flowchart (part 2) illustrating an example of a reading procedure.

FIGS. 13 and 14 are flowcharts illustrating an example of a reading procedure.

[Step S51] A request for reading from a volume is sent from the host server 210, and the I/O control unit 141 receives the request. At this time, the read source volume name and the read source region (address region) are specified. The I/O control unit 141 notifies the copy control unit 142 of the specified volume name and read source region, and inquires from which volume the read data is to be read.

[Step S52] The copy control unit 142 references the session management table 131 to determine whether a snapshot session has been set for the volume specified as the read source. If the applicable snapshot session has been set, the processing goes to step S54. If the applicable snapshot session has not been set, the processing goes to step S53.

[Step S53] The copy control unit 142 gives notification to the I/O control unit 141 to instruct the I/O control unit 141 to read the read data from the volume (corresponding to the copy source volume) specified as the read source. In response to the notification, the I/O control unit 141 reads the read data from the specified read source region in the source volume and sends the read data to the host server 210.

[Step S54] If a snapshot volume is specified as the read source, the copy control unit 142 advances the processing to step S61 in FIG. 14. On the other hand, if the copy source volume is specified as the read source, the copy control unit 142 advances the processing to step S55.

[Step S55] The copy control unit 142 acquires the value of the bit corresponding to the specified read source region from the write management bit map of the latest generation, among the write management bit maps associated with the specified copy source volume. If the bit value is "1", the processing goes to step S56. If the bit value is "0", the processing goes to step S62 in FIG. 14.

[Step S56] In the present case, a request for writing (update) to the applicable region in the copy source volume is made after a snapshot volume of the latest generation is created, among the snapshot volumes associated with the specified copy source volume. In addition, the write data as of that time is stored in the read source region in the snapshot volume of the latest generation.

Therefore, the copy control unit 142 gives notification to the I/O control unit 141 to instruct the I/O control unit to read the read data from the snapshot volume of the latest generation. In response to the notification, the I/O control unit 141 reads the read data from the specified write destination region in the snapshot volume of the latest generation and sends the read data to the host server 210.

Description is continued below with reference to FIG. 14.

[Step S61] The copy control unit 142 acquires the value of the bit corresponding to the specified read source region from the write management bit map corresponding to the generation (specified generation) of the snapshot volume specified as the read source. If the bit value is "1", the processing goes to step S62. If the bit value is "0", the processing goes to step S67.

[Step S62] The copy control unit 142 references the session management table 131 to determine, with regard to the copy source volume specified as the read source, whether a snapshot volume of an earlier generation is present. If a snapshot volume of an earlier generation is present, the processing goes to step S64. If such snapshot volume is absent, the processing goes to step S63.

The "earlier generation" as used herein is defined as follows. If the determination of Yes is given in step S61 or No in step S67, an earlier generation refers to a generation preceding the generation of the snapshot volume specified as the read source. If the determination of No is given in step S62, an earlier generation refers to a generation preceding the latest generation. If the determination of No is given in step S65, an earlier generation refers to a generation preceding the generation selected in step S64, which is the immediately preceding step.

[Step S63] The copy control unit 142 gives notification to the I/O control unit 141 to instruct the I/O control unit to read the read data from the copy source volume. In response to the notification, the I/O control unit 141 reads the read data from the specified read source region in the copy source volume and sends the read data to the host server 210.

[Step S64] The copy control unit 142 selects the immediately preceding generation (the latest generation among generations determined to be "earlier generation" in Step S62) as the processing target.

[Step S65] The copy control unit 142 acquires the value of the bit corresponding to the specified read source region from the write management bit map corresponding to the selected generation. If the bit value is "1", the processing goes to step S66. If the bit value is "0", the processing goes to step S62.

[Step S66] The copy control unit 142 gives notification to the I/O control unit 141 to instruct the I/O control unit 141 to read the read data from the snapshot volume of the generation currently selected as the processing target among the snapshot volumes associated with the specified copy source volume. In response to the notification, the I/O control unit 141 reads the read data from the specified read source region in the snapshot volume of the applicable generation and sends the read data to the host server 210.

[Step S67] The copy control unit 142 acquires the value of the bit corresponding to the specified read source region from the SSV management bit map corresponding to the specified generation. If the bit value is "1", the processing goes to step S68. If the bit value is "0", the processing goes to step S62.

[Step S68] The copy control unit 142 gives notification to the I/O control unit 141 to instruct the I/O control unit 141 to read the read data from the snapshot volume specified as the read source. In response to the notification, the I/O control unit 141 reads the read data from the specified read source region in the applicable snapshot volume and sends the read data to the host server 210.

Now, with reference to FIGS. 15 to 19, the following describes an example of transition of data arrangement in response to creation of a snapshot or a request for writing to a volume. FIGS. 15 to 19 illustrate examples of not only the actual data arrangement in a copy source volume or a snapshot volume but also the data arrangement expected by the user (data arrangement in each volume as viewed from the host server 210). Furthermore, if needed, a correspondence relationship with a step number in the processes in FIGS. 11 to 14 is shown.

FIGS. 15 to 19 are diagrams illustrating an example of transition of data arrangement. Note that, in FIGS. 15 to 19, it is assumed that the copy source volume VOL0 is divided into four regions R1 to R4 as in FIGS. 5 and 6. Furthermore, it is assumed that the data D1 to D4 are stored in the regions R1 to R4 in the copy source volume VOL0, respectively, in the initial state.

First, suppose that, at time T21, a request for creating a first-generation snapshot corresponding to the copy source volume VOL0 is made, as illustrated in FIG. 15. In this case, a first-generation snapshot volume SSV1 is created, but the actual data is not copied to the snapshot volume SSV1. In addition, a write management bit map BMw1 and an SSV management bit map BMs1 corresponding to the first-generation snapshot volume SSV1 are created. Every bit in both of the write management bit map BMw1 and the SSV management bit map BMs1 is set to "0".

Next, suppose that, at time T22, a request for writing data D1a to the region R1 in the copy source volume VOL0 (updating the region R1) is made. In this case, the value of the bit corresponding to the region R1 is checked in each of the latest-generation write management bit map BMw1 and SSV management bit map BMs1 (corresponding to steps S26 and S27). Since the bit values are both "0", the bit corresponding to the region R1 is updated to "1" for each of the write management bit map BMw1 and the SSV management bit map BMs1 (corresponding to step S30). At the same time, the data D1a is written to the region R1 in the latest-generation snapshot volume SSV1 (corresponding to step S31).

As described above, when a request for updating the copy source volume VOL0 is made, the new data D1a is only written to the snapshot volume SSV1, while copying of the data prior to update is not performed between volumes. Therefore, the time period between an update request and a response is shortened, and the response performance is improved.

Here, when a request for reading data is made in the state where the data D1a has been written, the following process is performed.

For example, when a request for reading from the region R1 in the copy source volume VOL0 is made, the bit corresponding to the region R1 among the bits in the latest-generation write management bit map BMw1 is checked (corresponding to step S55). Since the bit value is "1", the update data D1a is read from the region R1 in the latest-generation snapshot volume SSV1 (corresponding to step S58).

Furthermore, for example, when a request for reading from the region R2 in the copy source volume VOL0 is made, the bit corresponding to the region R2 among the bits in the latest-generation write management bit map BMw1 is checked (corresponding to step S55). Since the bit value is "0" and an earlier generation is absent, the data D2 is read from the region R2 in the copy source volume VOL0 (corresponding to steps S62 and S63).

Furthermore, for example, when a request for reading from the region R1 in the snapshot volume SSV1 is made, the bit corresponding to the region R1 among the bits in the write management bit map BMw1 of the first generation is checked (corresponding to step S61). Since the bit value is "1" and an earlier generation is absent, the data D1 is read from the region R1 in the copy source volume VOL0 (corresponding to steps S62 and S63).

Furthermore, for example, when a request for reading from the region R2 in the snapshot volume SSV1 is made, the bit corresponding to the region R2 in each of the first-generation write management bit map BMw1 and SSV management bit map BMs1 is checked (corresponding to steps S61 and S67). Since the bit values are both "0" and an earlier generation is absent, the data D2 is read from the region R2 in the copy source volume VOL0 (corresponding to steps S62 and S63).

Next, suppose that, at time T23, a request for creating a second-generation snapshot corresponding to the copy source volume VOL0 is made. In this case, a second-generation snapshot volume SSV2 is created, but the actual data is not copied to the snapshot volume SSV2. In addition, a write management bit map BMw2 and an SSV management bit map BMs2 corresponding to the second-generation snapshot volume SSV2 are created. Every bit in both of the write management bit map BMw2 and the SSV management bit map BMs2 is set to "0".

Figure 16:
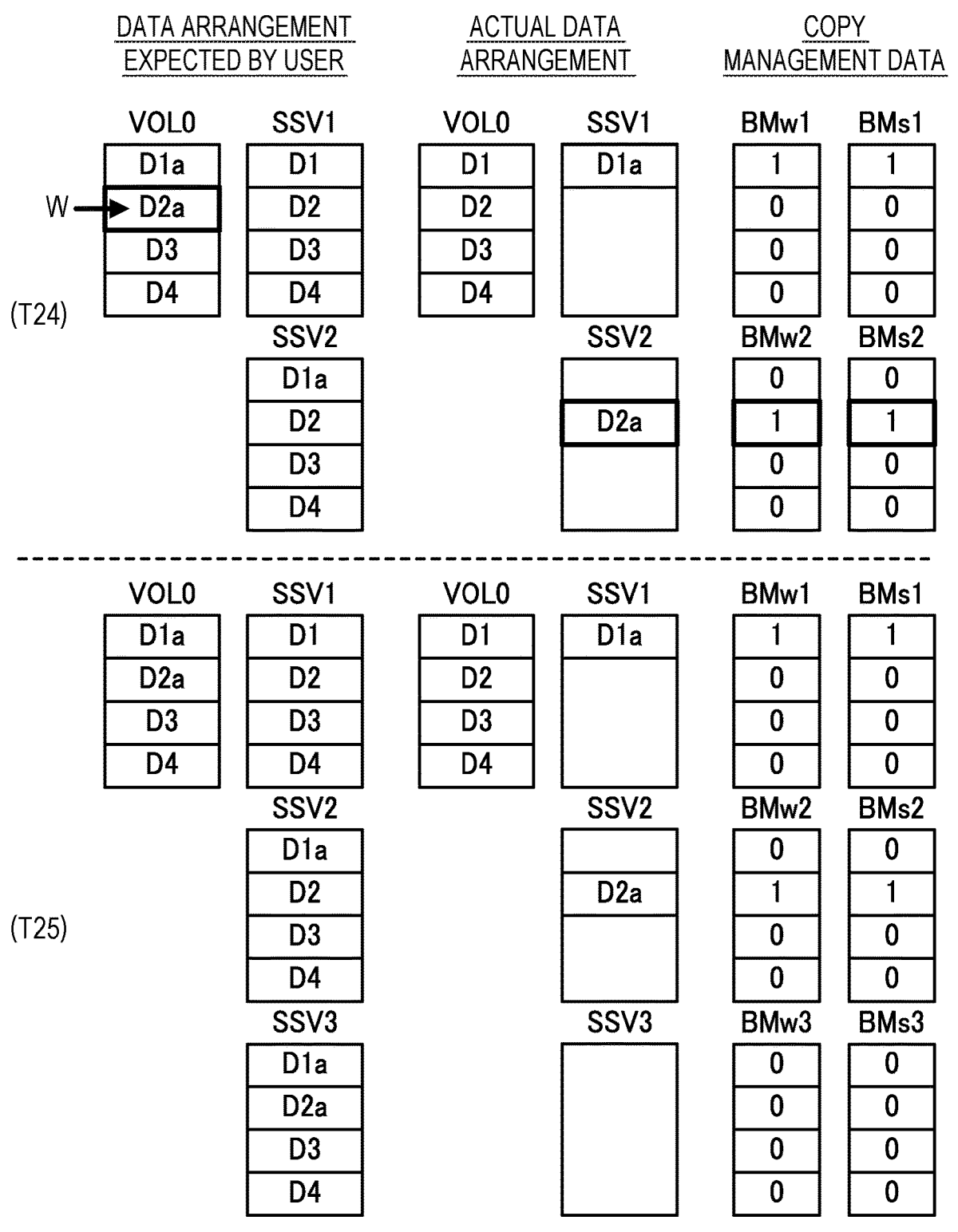

Next, suppose that, at time T24, a request for writing data D2a to the region R2 in the copy source volume VOL0 (updating the region R2) is made, as illustrated in FIG. 16. In this case, the value of the bit corresponding to the region R2 is checked in each of the latest-generation write management bit map BMw2 and SSV management bit map BMs2 (corresponding to steps S26 and S027). Since the bit values are both "0", the bit corresponding to the region R2 is updated to "1" for each of the write management bit map BMw2 and the SSV management bit map BMs2 (corresponding to step S30). At the same time, the data D2a is written to the region R2 in the latest-generation snapshot volume SSV2 (corresponding to step S31).

As described above, even in a case where a request for updating the copy source volume VOL0 is made after snapshot volumes of multiple generations are created, copying of the data prior to update is not performed between volumes. Therefore, the time period between an update request and a response is shortened, and the response performance is improved.

Next, suppose that, at time T25, a request for creating a third-generation snapshot corresponding to the copy source volume VOL0 is made. In this case, a third-generation snapshot volume SSV3 is created, but the actual data is not copied to the snapshot volume SSV3. In addition, a write management bit map BMw3 and an SSV management bit map BMs3 corresponding to the third-generation snapshot volume SSV3 are created. Every bit in both of the write management bit map BMw3 and the SSV management bit map BMs3 is set to "0".

Figure 17:
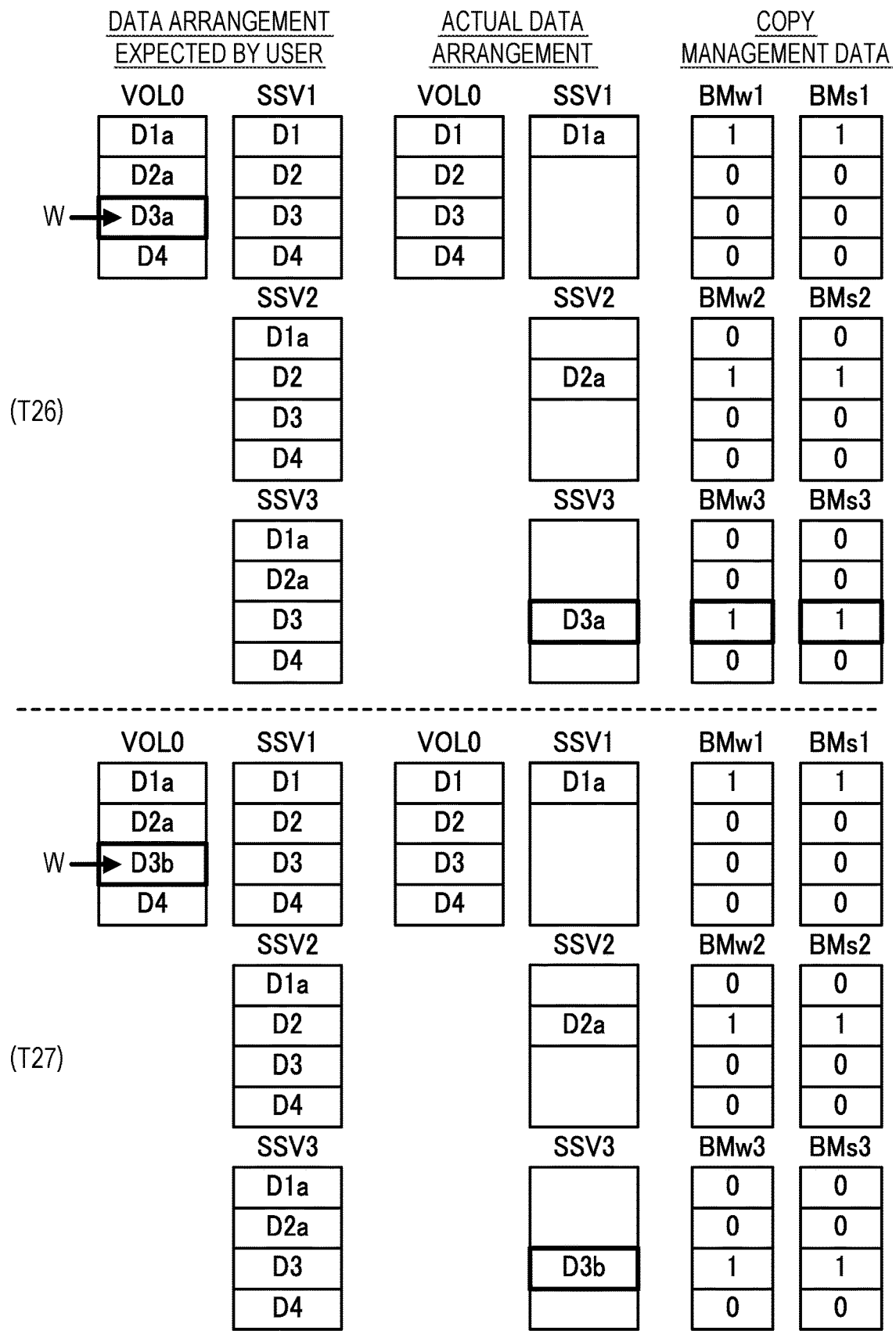
FIG. 17 is a diagram (part 3) illustrating an example of transition of data arrangement.

Next, suppose that, at time T26, a request for writing data D3a to the region R3 in the copy source volume VOL0 (updating the region R3) is made, as illustrated in FIG. 17. In this case, first, the value of the bit corresponding to the region R3 is checked in each of the latest-generation write management bit map BMw3 and SSV management bit map BMs3 (corresponding to steps S26 and S27). Since the bit values are both "0", the bit corresponding to the region R3 is updated to "1" for each of the write management bit map BMw3 and the SSV management bit map BMs3 (corresponding to step S30). At the same time, the data D3a is written to the region R3 in the latest-generation snapshot volume SSV3 (corresponding to step S31).

When a request for reading data is made in this state, the following process is performed.

For example, when a request for reading from the region R1 in the copy source volume VOL0 is made, the bit corresponding to the region R1 among the bits in the latest-generation write management bit map BMw3 is checked (corresponding to step S55). Since the bit value is "0" and an earlier generation is present, then the bit corresponding to the region R1 among the bits in the write management bit map of the immediately preceding generation (second generation) BMw2 is checked (corresponding to steps S62, S64, and S65). Since the bit value is "0" and an earlier generation is present, then the bit corresponding to the region R1 among the bits in the write management bit map of the immediately preceding generation (first generation) BMw1 is checked (corresponding to steps S62, S64, and S65). Since the bit value is "1", the data D1a is read from the region R1 in the first-generation snapshot volume SSV1 (corresponding to step S66).

Furthermore, for example, when a request for reading from the region R3 in the copy source volume VOL0 is made, the bit corresponding to the region R3 among the bits in the latest-generation write management bit map BMw3 is checked (corresponding to step S55). Since the bit value is "1", the data D3a is read from the region R3 in the latest-generation snapshot volume SSV3 (corresponding to step S56).

As described above, even in a case where snapshots of multiple generations are created and data in the copy source volume VOL0 is updated, data may be correctly read in response to a request for reading from the copy source volume VOL0.

Furthermore, for example, when a request for reading from the region R1 in the first-generation snapshot volume SSV1 is made, the bit corresponding to the region R1 among the bits in the first-generation write management bit map BMw1 is checked (corresponding to step S61). Since the bit value is "1" and an earlier generation is absent, the data D1 is read from the region R1 in the copy source volume VOL0 (corresponding to steps S62 and S63).

Furthermore, for example, when a request for reading from the region R2 in the first-generation snapshot volume SSV1 is made, the bit corresponding to the region R2 in each of the first-generation write management bit map BMw1 and SSV management bit map BMs1 is checked (corresponding to steps S61 and S67). Since the bit values are both "0" and an earlier generation is absent, the data D2 is read from the region R2 in the copy source volume VOL0 (corresponding to steps S62 and S63).

Furthermore, for example, when a request for reading from the region R3 in the third-generation snapshot volume SSV3 is made, the bit corresponding to the region R3 among the bits in the third-generation write management bit map BMw3 is checked (corresponding to step S61). Since the bit value is "1" and an earlier generation is present, then the bit corresponding to the region R3 among the bits in the second-generation write management bit map BMw2 is checked, the second generation being the immediately preceding generation (corresponding to steps S62, S64, and S65). Since the bit value is "0" and an earlier generation is present, then the bit corresponding to the region R3 among the bits in the first-generation write management bit map BMw1 is checked, the first generation being the immediately preceding generation (corresponding to steps S62, S64, and S65). Since the bit value is "0" and an earlier generation is absent, the data D3 is read from the region R3 in the copy source volume VOL0 (corresponding to steps S62 and S63).

Furthermore, for example, when a request for reading from the region R4 in the third-generation snapshot volume SSV3 is made, the bit corresponding to the region R4 in each of the third-generation write management bit map BMw3 and SSV management bit map BMs3 is checked (corresponding to steps S61 and S67). Since the bit values are both "0" and an earlier generation is present, then the bit corresponding to the region R4 among the bits in the second-generation write management bit map BMw2 is checked, the second generation being the immediately preceding generation (corresponding to steps S62, S64, and S65). Since the bit value is "0" and an earlier generation is present, then the bit corresponding to the region R4 among the bits in the first-generation write management bit map BMw1 is checked, the first generation being the immediately preceding generation (corresponding to steps S62, S64, and S65). Since the bit value is "0" and an earlier generation is absent, the data D4 is read from the region R4 in the copy source volume VOL0 (corresponding to steps S62 and S63).

As described above, even in a case where snapshots of multiple generations are created and data in the copy source volume VOL0 is updated, the data corresponding to a snapshot of any generation may be read correctly.

Next, suppose that, at time T27, a request for writing data D3$b$ to the region R3 in the copy source volume VOL0 (re-updating the region R3) is made. In this case, the value of the bit corresponding to the region R3 among the bits in the latest-generation write management bit map BMw3 is checked (corresponding to step S26). Since the bit value is "1", the data D3$b$ is overwritten to the region R3 in the latest-generation (third generation) snapshot volume SSV3 (corresponding to step S31).

In the processing at time T27, neither the write management bit map nor the SSV management bit map is updated particularly. Therefore, when a request for reading from the copy source volume VOL0 or from any of the snapshot volumes SSV1 to SSV3 of the respective generations is made in the state where the data. D3$b$ has been written, the processing is performed in the same manner as the processing performed at time T26, when the data D3$a$ has been written.

Next, suppose that, at time T28, a request for writing data D1$b$ to the region R1 in the third-generation snapshot volume SSV3 is made, as illustrated in FIG. 18. In this case, the value of the bit corresponding to the region R1 among the bits in the third-generation write management bit map BMw3 is checked (corresponding to step S41). Since the bit value is "0", the bit corresponding to the region R1 among the bits in the third-generation SSV management bit map BMs3 is updated to "1" (corresponding to step S42). Then, the data D3$b$ is written to the region R1 in the third-generation snapshot volume SSV3 (corresponding to step S46).

In this state, for example, when a request for reading from the region R1 in the third-generation snapshot volume SSV3 is made, the value of the bit corresponding to the region R1 among the bits in the third-generation write management bit map BMw3 is checked (corresponding to step S61). Since the bit value is "0", the value of the bit corresponding to the region R1 among the bits in the third-generation SSV management bit map BMs3 is checked (corresponding to step S67). Since the bit value is "1", the data D1$b$ is read from the region R1 in the third-generation snapshot volume SSV3 (corresponding to step S68). As described above, even if a snapshot volume is updated, the correct data corresponding to the snapshot volume may be read.

Furthermore, for example, when a request for reading from the region R1 in the copy source volume VOL0 is made, first, the value of the bit corresponding to the region R1 among the bits in the latest-generation write management bit map BMw3 is checked (corresponding to step S55). Since the bit value is "0" and an earlier generation is present, then the value of the bit corresponding to the region R1 among the bits in the second-generation write management bit map BMw2 is checked, the second generation being the immediately preceding generation (corresponding to steps S62, S64, and S65). Since the bit value is "0" and an earlier generation is present, then the value of the bit corresponding to the region R1 among the bits in the first-generation write management bit map BMw1 is checked, the first generation being the immediately preceding generation (corresponding to steps S62, S64, and S65). Since the bit value is "1", the data D1$a$ is read from the region R1 in the first-generation snapshot volume SSV1 (corresponding to step S66). As described above, even if a snapshot volume is updated, the correct data corresponding to the copy source volume VOL0 may be read.

Next, suppose that, at time T29, a request for writing data D3$c$ to the region R3 in the third-generation snapshot volume SSV3 is made. In this case, the value of the bit corresponding to the region R3 among the bits in the third-generation write management bit map BMw3 is checked (corresponding to step S41). Since the bit value is "1", the region R3 in the snapshot volume SSV3 stores the data for the copy source volume VOL0.

Therefore, the data D3$b$ stored in the region R3 is overwrite-copied to the region R3 in the second-generation snapshot volume SSV2, the second generation being the immediately preceding generation, so that the data D3$b$ is saved (corresponding to step S43). In addition, the bit corresponding to the region R3 is updated to "1" for each of the second-generation write management bit map BMw2 and SSV management bit map BMs2 (corresponding to step S44). Furthermore, the bit corresponding to the region R3 among the bits in the third-generation write management bit map BMw3 is updated to "0", and the bit corresponding to the region R3 among the bits in the third-generation SSV management bit map BMs3 is updated to "1" (corresponding to step S45). However, only the former bit is updated in this case. Then, data in the region R3 in the third-generation snapshot volume SSV3 is overwritten with the new data D3$c$ (step S46).

In this state, when, for example, a request for reading from the region R3 in the copy source volume VOL0 is made, first, the value of the bit corresponding to the region R3 among the bits in the latest-generation write management bit map BMw3 is checked (corresponding to step S55). Since the bit value is "0" and an earlier generation is present, then the value of the bit corresponding to the region R3 among the bits in the second-generation write management bit map BMw2 is checked, the second generation being the immediately preceding generation (corresponding to steps S62, S64, and S65). Since the bit value is "1", the data D3$b$ is read from the region R3 in the second-generation snapshot volume SSV2 (corresponding to step S66). As described above, even if a snapshot volume is updated, the correct data corresponding to the copy source volume VOL0 may be read.

Figure 19:
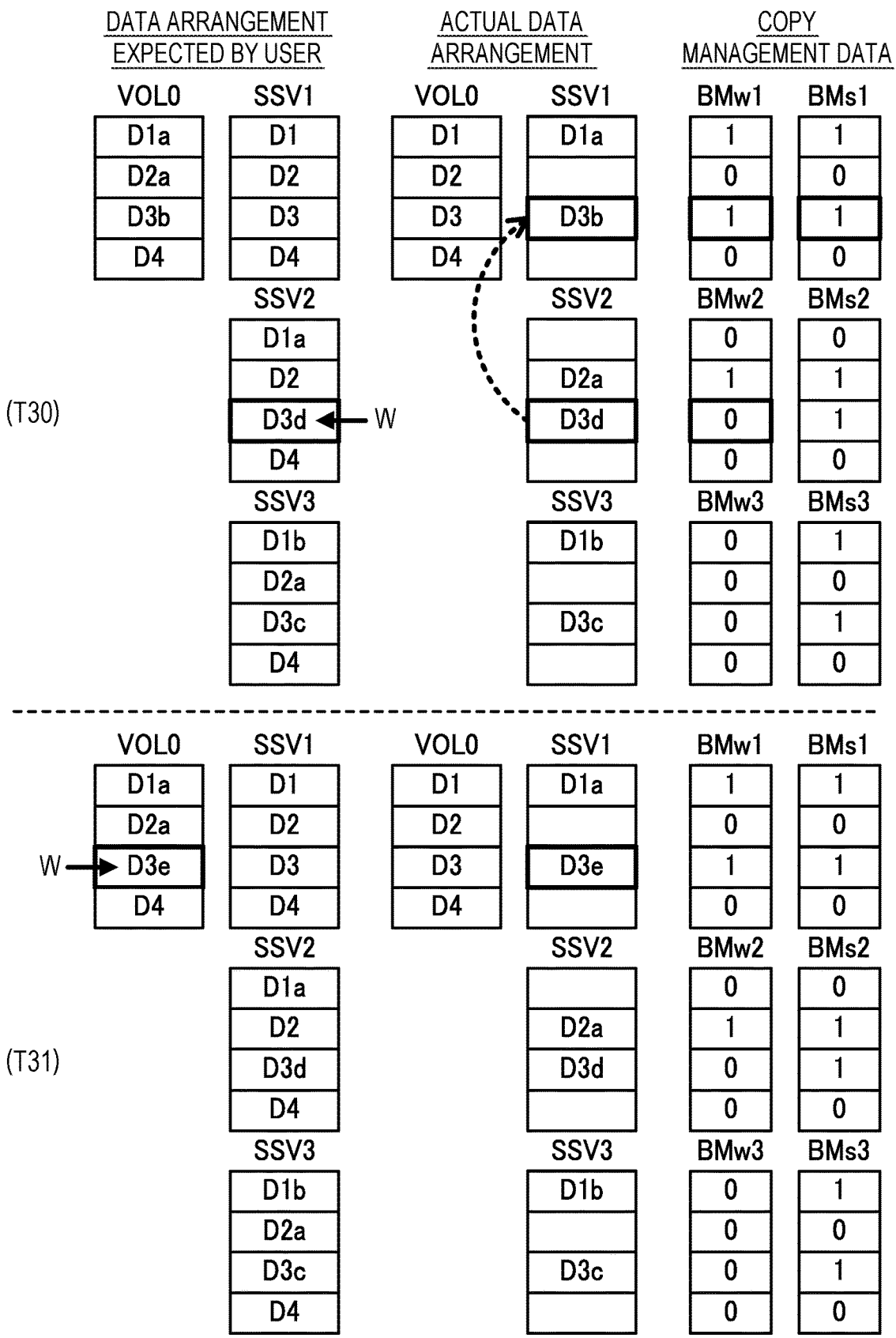
FIG. 19 is a diagram (part 5) illustrating an example of transition of data arrangement.

Next, suppose that, at time T30, a request for writing data D3$d$ to the region R3 in the second-generation snapshot volume SSV2 is made, as illustrated in FIG. 19. In this case, the value of the bit corresponding to the region R3 among the bits in second-generation write management bit map BMw2 is checked (corresponding to step S41). Since the bit value is "1", the region R3 in the snapshot volume SSV2 stores the data for the copy source volume VOL0.

Therefore, the data D3b stored in the region R3 is overwrite-copied to the region R3 in the first-generation snapshot volume SSV1, the first generation being the immediately preceding generation, so that the data D3b is saved (corresponding to step S43). In addition, the bit corresponding to the region R3 is updated to "1" for each of the first-generation write management bit map BMw1 and SSV management bit map BMs1 (corresponding to step S44). Furthermore, the bit corresponding to the region R3 among the bits in the second-generation write management bit map BMw2 is updated to "0", and the bit corresponding to the region R3 among the bits in the second-generation SSV management bit map BMs2 is updated to "1" (corresponding to step S45). However, only the former bit is updated in this case. Then, data in the region R3 in the second-generation snapshot volume SSV2 is overwritten with the new data D3d (step S46).

Next, suppose that, at time T31, a request for writing data D3e to the region R3 in the copy source volume VOL0 (updating the region R3) is made. In this case, first, the value of the bit corresponding to the region R3 is checked in each of the latest-generation write management bit map BMw3 and SSV management bit map BMs3 (corresponding to steps S26 and S27).

The former bit value is "0", the latter bit value is "1", and an earlier generation is present (corresponding to step S28). Accordingly, then, the value of the bit corresponding to the region R3 is checked in each of the second-generation write management bit map BMw2 and SSV management bit map BMs2, the second generation being the immediately preceding generation (corresponding to steps S29, S26, and S27).

Since the former bit value is "0", the latter bit value is "1", and an earlier generation is present, then the value of the bit corresponding to the region R3 in the first-generation write management bit map BMw1 is checked, the first generation being the immediately preceding generation (corresponding to steps S28, S29, and S26). Since the bit value is "1", the new data D3e is overwritten to the region R3 in the first-generation snapshot volume SSV1 (corresponding to step S31). Neither the first-generation write management bit map BMw1 nor the first-generation SSV management bit map BMs1 is updated.

In this state, for example, when a request for reading from the region R3 in the copy source volume VOL0 is made, the value of the bit corresponding to the region R3 among the bits in the latest-generation write management bit map BMw3 is checked (corresponding to step S55). Since the bit value is "0" and an earlier generation is present, then the value of the bit corresponding to the region R3 among the bits in the second-generation write management bit map BMw2 is checked, the second generation being the immediately preceding generation (corresponding to steps S62, S64, and S65).

Since the bit value is "0" and an earlier generation is present, then the value of the bit corresponding to the region R3 among the bits in the first-generation write management bit map BMw1 is checked, the first generation being the immediately preceding generation (corresponding to steps S62, S64, and S65). Since the bit value is "1", the data D3e is read from the region R3 in the first-generation snapshot volume SSV1 (corresponding to step S66).

As described above, even if a snapshot volume is updated (corresponding to times T29 and T30) and then the copy source volume VOL0 is further updated, the correct data corresponding to the copy source volume VOL0 may be read.

Furthermore, for example, when a request for reading from the region R3 in the second-generation snapshot volume SSV2 is made, the value of the bit corresponding to the region R3 among the bits in the second-generation write management bit map BMw2 is checked (corresponding to step S61). Since the bit value is "0", then, the value of the bit corresponding to the region R3 among the bits in the second-generation SSV management bit map BMs2 is checked (corresponding to step S67). Since the bit value is "1", the data D3d is read from the region R3 in the second-generation snapshot volume SSV2 (corresponding to step S68).

Furthermore, for example, when a request for reading from the region R3 in the first-generation snapshot volume SSV1 is made, the value of the bit corresponding to the region R3 among the bits in the first-generation write management bit map BMw1 is checked (corresponding to step S61). Since the bit value is "1" and an earlier generation is absent, the data D3 is read from the region R3 in the copy source volume VOL0 (corresponding to steps S62 and S63).

As described above, even if a certain region on a snapshot volume is updated and then the corresponding region in the copy source volume VOL0 is further updated, the correct data corresponding to the snapshot volume of each generation may be read.

Modification of Second Embodiment

Next, the following describes a modification in which part of the processing in the above-described second embodiment is changed.

In the reading process illustrated in FIG. 13, when a request for reading from the copy source volume VOL0 is made, which read source volume is to be used is determined on the basis of a write management bit map and an SSV management bit map. On the other hand, according to the present modification, when write data is written to a snapshot volume in response to a request for writing to the copy source volume VOL0, the write destination volume is registered in the SSV map table described below. Then, when a request for reading from the copy source volume VOL0 is made, which read source volume is to be used is determined based on the SSV map table. As a result, the reading procedure is simplified to achieve a higher reading speed.

FIG. 20 is a diagram illustrating a configuration example of the SSV map table. In the SSV map table 133 illustrated in FIG. 20, SSV numbers are registered in association with their corresponding address ranges. An address range represents a range of logical addresses (logical block address, LBA) with regard to a copy management unit region in a volume. An SSV number represents an identification number (generation number) of a snapshot volume.

The SSV map table 133 is created when a request for creating a first-generation snapshot for the copy source volume VOL0 is made, and stored in the storage unit 130. In the initial state, no SSV number is registered in association with any address range. Then, regarding a certain address range, when data corresponding to the address range in the copy source volume is stored in any snapshot volume, an SSV number representing the snapshot volume is registered.

Specifically, when data is written to a snapshot volume in step S31 in FIG. 11 and step S43 in FIG. 12, an SSV number representing the write destination snapshot volume is registered in association with the address range representing the write destination region. If an SSV number is already registered, the SSV number is overwritten with the new SSV number.

Figure 21:
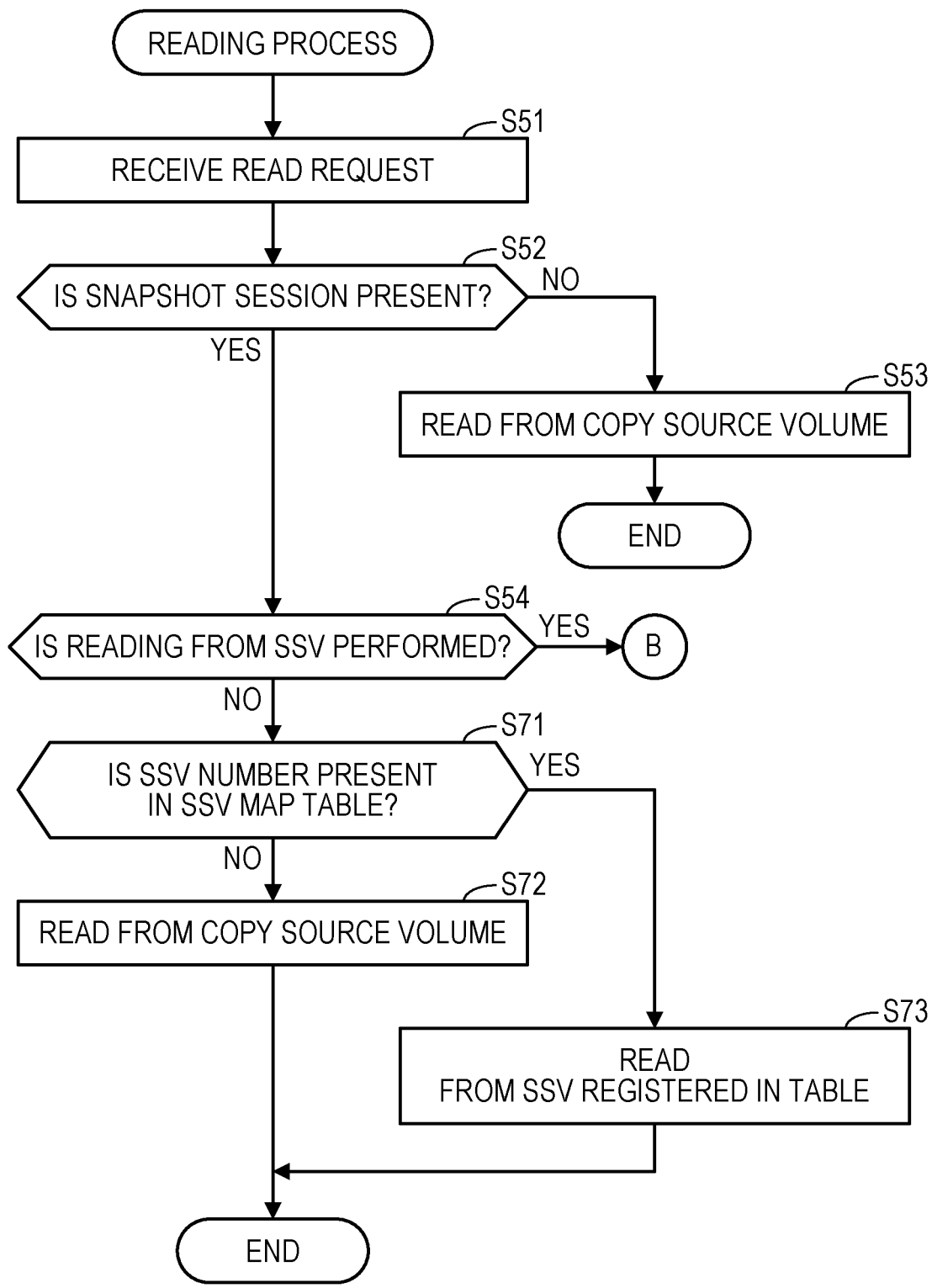
FIG. 21 is a flowchart illustrating an example of a reading procedure according to a modification.

FIG. 21 is a flowchart illustrating an example of a reading procedure according to the modification. In the present modification, if the determination of No is given in step S54 in FIG. 13 (if a request for reading from the copy source volume VOL0 is made), the process steps from step S71 illustrated in FIG. 21 are performed.

[Step S71] The copy control unit 142 references the SSV map table 133 to determine whether an SSV number is registered in association with the address range representing the read source region. If the SSV number is not registered, the processing goes to step S72. If the SSV number is registered, the processing goes to step S73.

[Step S72] The copy control unit 142 gives notification to the I/O control unit 141 to instruct the I/O control unit to read the read data from the copy source volume. In response to the notification, the I/O control unit 141 reads the read data from the specified read source region in the copy source volume and sends the read data to the host server 210.

[Step S73] The copy control unit 142 gives notification to the I/O control unit 141 to instruct the I/O control unit 141 to read the read data from the snapshot volume indicated by the SSV number registered in the SSV map table 133. In response to the notification, the I/O control unit 141 reads the read data from the specified read source region in the applicable snapshot volume and sends the read data to the host server 210.

In this way, when a request for reading from the copy source volume VOL0 is made, the volume from which the read data is to be read can be determined only on the basis of information regarding a record corresponding to a read source region in the SSV map table 133. Therefore, since the reading process is simplified, the time for responding to a read request may be shortened and the response performance may be improved.

Note that the processing functions of the devices described in each of the above embodiments (for example, the storage control device 1, the CM 110, the host server 210, and the management server 220) can be implemented by a computer. In that case, a program describing the processing content of the functions to be held by each device is provided, and the above processing functions are implemented on the computer by execution of the program on the computer. The program describing the processing content can be recorded on a computer-readable recording medium. The computer-readable recording medium includes a magnetic storage device, an optical disc, a magneto-optical recording medium, a semiconductor memory, or the like. The magnetic storage device includes a hard disk drive (HDD), a magnetic tape, or the like. The optical disc includes a Compact Disc (CD), a Digital Versatile Disc (DVD), a Blu-ray Disc (BD, registered trademark), or the like. The magneto-optical recording medium includes a Magneto-Optical (MO) disk or the like.

In a case where the program is to be distributed, for example, portable recording media such as DVDs and CDs, in which the program is recorded, are sold. Furthermore, it is possible to store the program in a storage device of a server computer and transfer the program from the server computer to another computer through a network.

The computer that executes the program stores, for example, the program recorded on the portable recording medium or the program transferred from the server computer in its own storage device. Then, the computer reads the program from the storage device of the computer and executes processing according to the program. Note that, the computer can also read the program directly from the portable recording medium and execute processing according to the program. Furthermore, the computer can also sequentially execute processing according to the received program each time when the program is transferred from the server computer connected via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device comprising:
   a memory; and
   a processor coupled to the memory and configured to:
   when a first write request for writing first data to a first unit region among unit regions included in a first storage region is received, write the first data to the first unit region in a second storage region corresponding to a snapshot, the snapshot being corresponding to the first storage region,
   send a first completion response to the first write request for writing, and
   when a first read request requesting for reading from the first unit region in the second storage region is received, send second data stored in the first unit region in the first storage region, as read data in accordance with the first read request,
   write, when a second write request for writing third data to the first unit region in the first storage region is received after a request for creating a following-generation snapshot corresponding to the first storage region is received, the third data to the first unit region in a third storage region corresponding to the following-generation snapshot,
   send a second completion response to the second write request for writing the third data,
   send, when a third read request requesting for reading from the first unit region in the third storage region is received, the second data stored in the first unit region in the first storage region, as read data in accordance with the third read request, and
   send, when a fourth read request requesting for reading from the first unit region in the first storage region is received, the third data stored in the first unit region in the third storage region, as read data in accordance with the fourth read request.

2. The storage control device according to claim 1, wherein the first write request for writing first data is received after receiving a request for creating the snapshot.

3. The storage control device according to claim 1, wherein the processor sends, when a second read request requesting for reading from the first unit region in the first storage region is further received, the first data stored in the first unit region in the second storage region, as read data in accordance with the second read request.

4. The storage control device according to claim 3, wherein the processor is further configured to:
copy, when a third write request for writing fourth data to the first unit region in the third storage region is received after completion of writing the third data to the third storage region, the third data stored in the first unit region in the third storage region to the first unit region in the second storage region,
write the fourth data to the first unit region in the third storage region after coping the third data, and
send, when a fifth read request requesting for reading from the first unit region in the first storage region is received, the third data stored in the first unit region in the second storage region, as read data in accordance with the fifth read request.

5. The storage control device according to claim 4, wherein the processor is further configured to:
send, when a sixth read request requesting for reading from the first unit region in the third storage region is received after completion of writing the fourth data to the third storage region, the fourth data stored in the first unit region in the third storage region, as read data in accordance with the sixth read request, and
send, when a seventh read request requesting for reading from the first unit region in the second storage region is received, the second data stored in the first unit region in the first storage region, as read data in accordance with the seventh read request.

6. The storage control device according to claim 1, wherein the processor is further configured to:
create, when a request for creating the snapshot is received, first write management information indicating, for each of the unit regions, a state of reception of a write request for writing to the first storage region,
cause the memory to store the first write management information,
record, when the first write request for writing the first data is received, that the first write request for writing to the first unit region has been made, in the first write management information, and
determine, when a read request specifying either one of the first storage region and the second storage region as a read source is received, whether data desired to be read from the first storage region or the second storage region based on the first write management information.

7. The storage control device according to claim 6, wherein the processor is further configured to:
create, when a request for creating a following-generation snapshot corresponding to the first storage region is received, second write management information indicating, for each of the unit regions, a state of reception of a request for writing to the first storage region,
causes the memory to store the second write management information,
write, when a fourth write request for writing fifth data to a second unit region among the unit regions included in the first storage region is received after creation of the second write management information, the fifth data to the second unit region in a fourth storage region corresponding to the following-generation snapshot, and
records, in the second write management information, that the fourth write request for writing to the second unit region has been made, and determine, when a read request specifying any of the first storage region, the second storage region, or the fourth storage region as a read source is received, from which storage region, the first storage region, the second storage region, or the fourth storage region, data desired to be read is to be read, based on the first write management information and the second write management information.

8. The storage control device according to claim 7, wherein the processor is further configured to:
create, when a request for creating the snapshot is received, first data management information indicating, for each of the unit regions, a state of data retention in the second storage region,
cause the memory to store the first data management information,
record, when the first write request for writing the first data is received, data being retained in the first unit region in the first write management information,
create, when a request for creating the following-generation snapshot is received, second data management information indicating, for each of the unit regions, a state of data retention in the fourth storage region,
cause the memory to store the second data management information,
record, when the fourth write request for writing the fifth data is received, in the second write management information, that data is retained in the second unit region,
copy, when a fifth write request for writing sixth data to the second unit region in the fourth storage region is received after creation of the second data management information, the fifth data stored in the second unit region in the fourth storage region to the second unit region in the second storage region,
write the sixth data to the second unit region in the fourth storage region after coping the fifth data,
record, in the first write management information, that the fifth write request for writing to the second unit region having been made,
record, in the first data management information, that data is retained in the second unit region,
record, in the second write management information, that the fifth request for writing to the second unit region is not made,
read, when a request for reading from a third unit region among the unit regions included in the fourth storage region and both the first write management information and the second write management information indicate that a sixth write request for writing to the third unit region has been made, data from the third unit region in the first storage region, and
read, when the request for reading from the third unit region among the unit regions included in the fourth storage region, the second write management information indicates that the sixth write request for writing to the third unit region has not been made, and the second data management information indicates that data is retained in the third unit region, data from the third unit region in the fourth storage region.

9. A non-transitory computer-readable storage medium storing a program that causes a processor included in a storage control device to execute a process, the process comprising:
when a first write request for writing first data to a first unit region among unit regions included in a first storage region is received, writing the first data to the first unit region in a second storage region corresponding to a snapshot, the snapshot being corresponding to the first storage region;

sending a first completion response to the first write request for writing;

when a first read request requesting for reading from the first unit region in the second storage region is received, sending second data stored in the first unit region in the first storage region, as read data in accordance with the first read request, writing, when a second write request for writing third data to the first unit region in the first storage region is received after a request for creating a following-generation snapshot corresponding to the first storage region is received, the third data to the first unit region in a third storage region corresponding to the following-generation snapshot;

sending a second completion response to the second write request for writing the third data;

sending, when a third read request requesting for reading from the first unit region in the third storage region is received, the second data stored in the first unit region in the first storage region, as read data in accordance with the third read request; and sending, when a fourth read request requesting for reading from the first unit region in the first storage region is received, the third data stored in the first unit region in the third storage region, as read data in accordance with the fourth read request.

10. The non-transitory computer-readable storage medium according to claim 9, wherein the first write request for writing first data is received after receiving a request for creating the snapshot.

11. The non-transitory computer-readable storage medium according to claim 9, the process further comprising:

sending, when a second read request requesting for reading from the first unit region in the first storage region is further received, the first data stored in the first unit region in the second storage region, as read data in accordance with the second read request.

12. A storage control method comprising:

when a first write request for writing first data to a first unit region among unit regions included in a first storage region is received, writing the first data to the first unit region in a second storage region corresponding to a snapshot, the snapshot being corresponding to the first storage region;

sending a first completion response to the first write request for writing;

when a first read request requesting for reading from the first unit region in the second storage region is received, sending second data stored in the first unit region in the first storage region, as read data in accordance with the first read request, writing, when a second write request for writing third data to the first unit region in the first storage region is received after a request for creating a following-generation snapshot corresponding to the first storage region is received, the third data to the first unit region in a third storage region corresponding to the following-generation snapshot;

sending a second completion response to the second write request for writing the third data;

sending, when a third read request requesting for reading from the first unit region in the third storage region is received, the second data stored in the first unit region in the first storage region, as read data in accordance with the third read request; and sending, when a fourth read request requesting for reading from the first unit region in the first storage region is received, the third data stored in the first unit region in the third storage region, as read data in accordance with the fourth read request.

13. The storage control method according to claim 12, wherein the first write request for writing first data is received after receiving a request for creating the snapshot.

14. The storage control method according to claim 12, the process further comprising:

sending, when a second read request requesting for reading from the first unit region in the first storage region is further received, the first data stored in the first unit region in the second storage region, as read data in accordance with the second read request.

* * * * *